(12) United States Patent
Moon

(10) Patent No.: US 9,043,931 B2
(45) Date of Patent: May 26, 2015

(54) USB DRIVE WITH MULTIPLE PRINTED CIRCUIT BOARD LAYERS FOR STORING DATA IN A MEMORY

(71) Applicant: Sung Ub Moon, Richmond (CA)

(72) Inventor: Sung Ub Moon, Richmond (CA)

( * ) Notice: Subject to any disclaimer, the term of this patent is extended or adjusted under 35 U.S.C. 154(b) by 190 days.

(21) Appl. No.: 13/986,739

(22) Filed: May 31, 2013

(65) Prior Publication Data

US 2014/0317757 A1    Oct. 23, 2014

(30) Foreign Application Priority Data

Apr. 2, 2013   (CA) ..................................... 2812607

(51) Int. Cl.
   *G06F 21/62*   (2013.01)
   *G06F 21/85*   (2013.01)

(52) U.S. Cl.
   CPC ................ *G06F 21/62* (2013.01); *G06F 21/85* (2013.01); *G06F 2213/0042* (2013.01); *G06F 2212/2146* (2013.01); *G06F 2213/3812* (2013.01)

(58) Field of Classification Search
   CPC .  G06F 21/85; G06F 21/62; G06F 2213/0042; G06F 2213/3812; G06F 2212/2146
   USPC ............. 726/27; 713/182; 710/302, 305, 313; 711/115
   See application file for complete search history.

(56) References Cited

U.S. PATENT DOCUMENTS

| | | | |
|---|---|---|---|
| 6,535,947 B1 * | 3/2003 | Amoni et al. ................. | 710/305 |
| 6,993,618 B2 * | 1/2006 | Chen et al. .................... | 710/305 |
| 7,073,010 B2 * | 7/2006 | Chen et al. .................... | 710/313 |
| 8,725,944 B2 * | 5/2014 | Burd ............................. | 711/114 |
| 2007/0168564 A1 * | 7/2007 | Conley et al. ...................... | 710/1 |
| 2007/0180264 A1 * | 8/2007 | Ni et al. ......................... | 713/186 |
| 2008/0222349 A1 * | 9/2008 | Lee et al. ....................... | 711/103 |
| 2009/0006726 A1 * | 1/2009 | Fu et al. ........................ | 711/103 |
| 2009/0234976 A1 * | 9/2009 | Kale et al. ....................... | 710/13 |
| 2009/0248966 A1 * | 10/2009 | Crandell ...................... | 711/103 |
| 2011/0145474 A1 * | 6/2011 | Intrater ....................... | 711/103 |
| 2011/0302358 A1 * | 12/2011 | Yu et al. ........................ | 711/103 |
| 2012/0027868 A1 * | 2/2012 | Penney ......................... | 424/537 |
| 2012/0278543 A1 * | 11/2012 | Yu et al. ........................ | 711/103 |

* cited by examiner

*Primary Examiner* — Jung Kim
*Assistant Examiner* — Thomas Ho
(74) *Attorney, Agent, or Firm* — Bull, Housser & Tupper LLP

(57) ABSTRACT

A multi-layer USB drive for storing data in a memory has at least two printed circuit board assemblies, each one including a memory for storing data and a control microprocessor controlling the flow of data to and from the memory. The circuit board assemblies are operatively connected to one another in a serial manner for exchange of data between adjacent assemblies upon access by a user and wherein at least one of the control microprocessors is security enabled requiring a user defined security input for accessing the memory of the printed circuit board assembly of that security enabled control microprocessor. A USB connector is for connecting to a USB slot of a device and the USB connector is operatively connected to only one of the printed circuit board assemblies. A USB hub is provided on at least one of the assemblies for recognizing the circuit board assemblies of the USB drive. An opaque housing completely encloses the circuit board assemblies preventing at least the printed circuit board assembly or assemblies other than the one connected to the USB connector from being viewed.

18 Claims, 24 Drawing Sheets

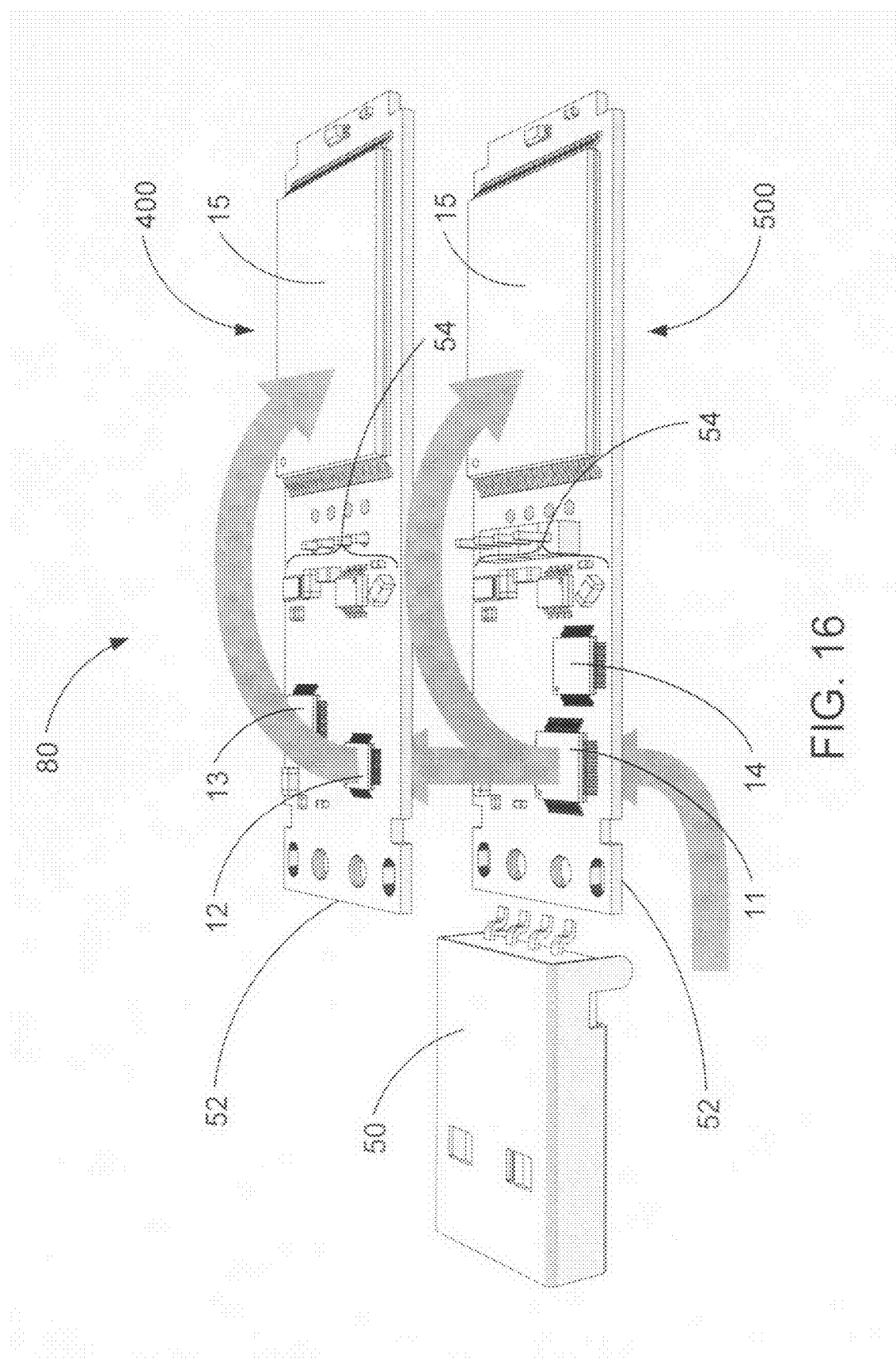

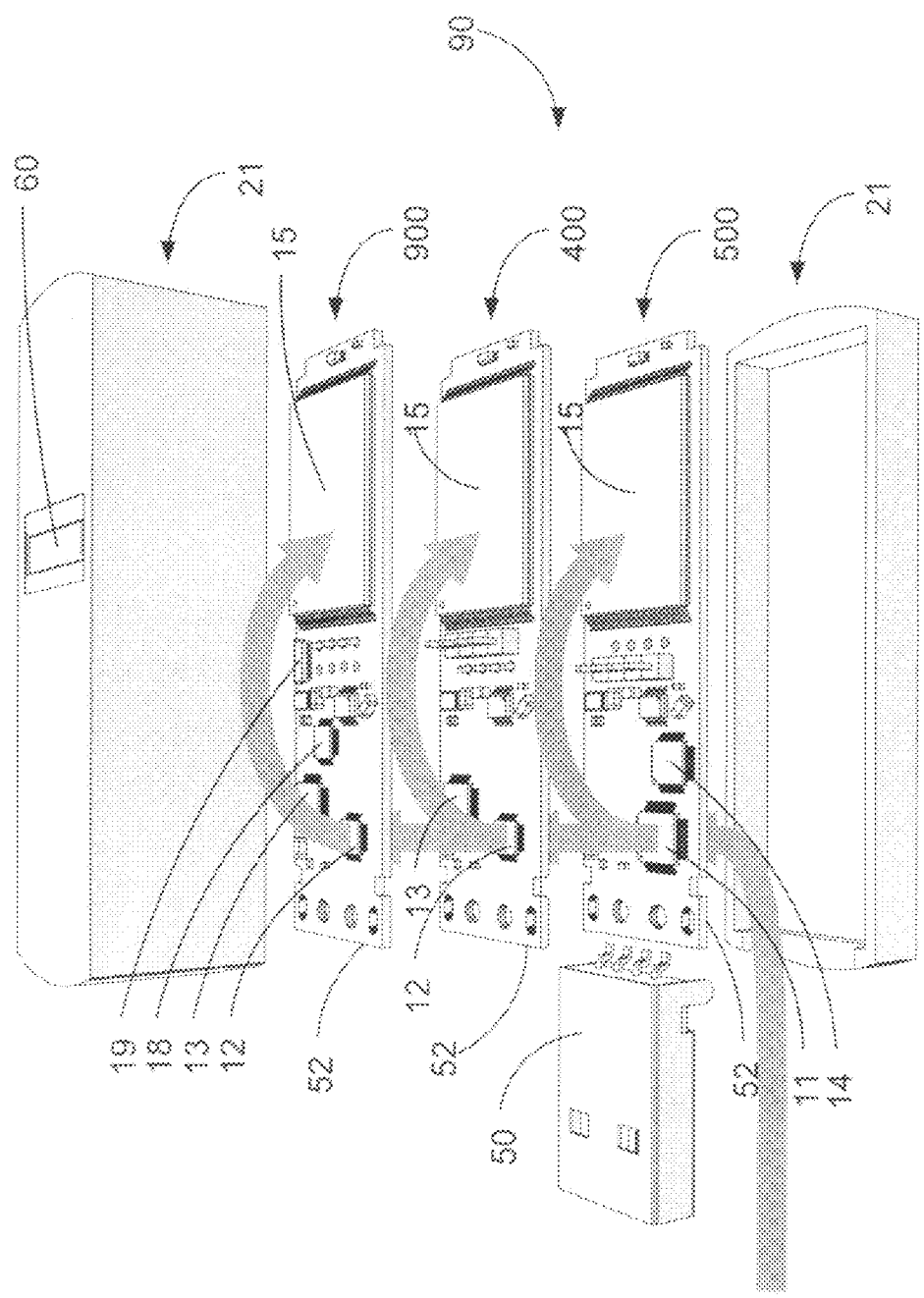

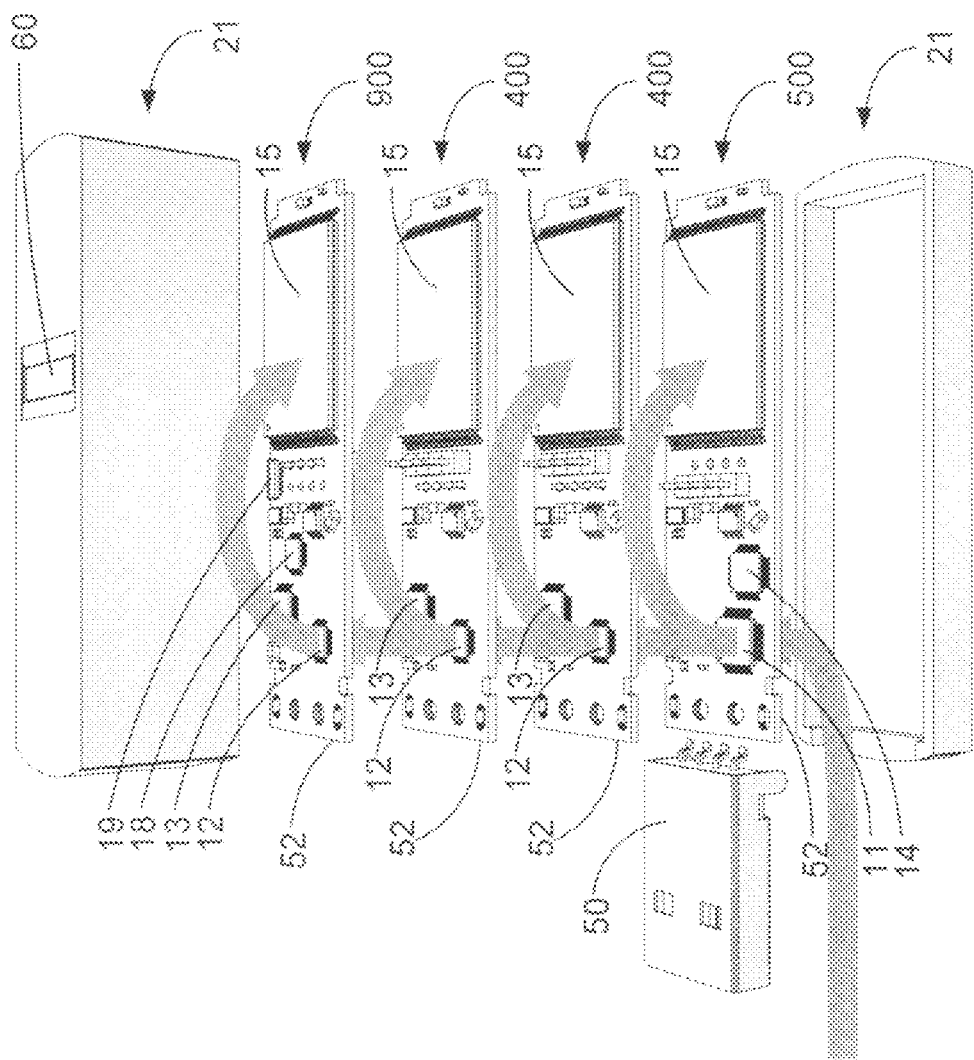

| Serial Number | Permissions | | | |
|---|---|---|---|---|
| 500-0001 | ☑ Print | ☐ File Delete | | |
| | ☐ Edit | ☐ Lock | | |
| | ☐ Copy | ☐ ... | | |
| 900-0001 | ☑ Print | ☐ File Delete | | |
| | ☐ Edit | ☐ Lock | | |
| | ☐ Copy | ☐ ... | | |
| ... | ... | ... | ... | ... |

FIG. 22

USB DRIVE WITH MULTIPLE PRINTED CIRCUIT BOARD LAYERS FOR STORING DATA IN A MEMORY

CLAIM OF PRIORITY

The priority of related Canadian Patent Application Serial No. 2,812,607, entitled "A Multi-Layer USB Storage Drive with Physically Separated Secure Storage Layer and Non Secure Storage Layer, and with Multiple Layers", filed Apr. 2, 2013, is hereby claimed.

FIELD OF THE INVENTION

This invention relates to improvements to data security contained in the memory of USB storage devices and other mobile storage devices, including USB Flash Drives (or USB Pen Drives), USB Hard Drives, USB Media Cards (or Memory Cards), USB Media Cards (or Memory Cards Readers) through media card reader controller. Hard Drive can be of various forms, including traditional IDE Hard Drive, SATA Hard Drive, SCSI Hard Drive, or advanced SSD—Solid State Flash Drive. Media Cards can include SD—Secure Digital Cards, MMC—Multimedia Cards, CF—CompactFlash Cards, MS—Memory Sticks, xD—Extreme Digital Picture Cards, and the like.

The invention is directed to a Multi-Layer USB Drive (sometimes referred to herein as a MLUD) device connectable to a computer system through a USB port to operate as a portable storage device. The MLUD is configured to make it difficult to locate and to access secure data stored on the device and to permit a variety of security features (or sometimes no security) at different levels (or layers) of printed circuit board assemblies within a single MLUD. The complete Multi-Layer USB Drive (MLUD) is comprised of two or more printed circuit board assemblies (sometimes referred to herein as PCBAs) connected and housed together.

BACKGROUND

The security of data contained in portable storage devices is a significant concern among users of those devices and security personnel charged with maintaining the security of sensitive information. The problem is exacerbated by the development of small storage devices which are portable and are therefore more susceptible to loss and theft. In recent years there have been many examples of security breaches when sensitive data contained on portable data storage devices are stolen or mislaid and then publicly released. With the ubiquitous nature of the Internet sensitive data lost or stolen can easily and quickly be disseminated throughout the world before steps can be taken to contain that dissemination. Once that information is leaked to the Internet it is often impossible to contain it. The release of this sensitive data can cause considerable hardship and liability to those entrusted with the care and security of that data.

To mitigate against the unauthorised disclosure of sensitive data protective measure have been employed, including password protection, finger print recognition, locking mechanisms and so on. However there is a need for further security enhancements to USB memory devices to reduce the risk of security breaches and unauthorized use or dissemination of sensitive data.

SUMMARY OF THE INVENTION

Applicant has developed a system for securing sensitive information on USB memory devices by employing a Multi-Layer USB Drive having two or more printed circuit board assemblies connected in series. Access is initially granted to a user to the first PCBA. Access to additional PCBAs occurs only after a user is aware of and follows certain access protocols to access successive PCBAs connected in series to the first or initial PCBA. Additional PCBAs can also be connected and accessed successively based on knowledge of their existence by a user and implementing the correct access protocol. Even if that knowledge exists and the access protocol implemented, additional security features can be employed in order to provide additional security as to unauthorised access, such as password protection, fingerprint recognition, data encryption, DRM (Digital Rights Management), security tokens, data masking, anti-virus software and/or other protective features. The Multi-Layer USB Drive (MLUD), with its the two or more PCBAs, is contained within one housing to reduce the opportunity for unauthorised users to gain the knowledge that further PCBAs, in addition to the initial or first PCBA, are contained with the housing.

Applicant's Multi-Layer USB Drive can be configures so that the more sensitive the data the further that data is stored from the initial PCBA. In a MLUD with three PCBAs, for example, the initial or first PCBA could have no security features, and would contain data not considered of a sensitive or confidential nature. The next PCBA connected in series could include a more simpler protocol for access such as an icon visible on the screen to be mouse-clicked to access that second level PCBA. That second level PCBA could contain data of a sensitive or confidential nature and access could be further protected by a password. And the third PCBA, connected in series to the second PCBA could contain the most sensitive data and have the highest level of protection. This could be by touch screen access protocol requiring the touching of certain pre-determined points on the screen in a predetermined order. And then requiring a user to pass through a security token system to access the data.

In the event of loss or theft leading to an attempt to access the data, many unauthorised users may not even be aware that anything other than the initial or first PCBA exists within the housing of the USB memory device. Sensitive data in other PCBAs connected in series is never accessed as there is no knowledge of their existence. And even in the event that the second level PCBA is accessed, the additional protection of a password, or other security feature can prevent access to the data on the second level PCBA.

As a further optional feature of applicant's invention sensitive data contained in any level of the Multi-Layer USB Drive could be deleted remotely under the instruction of a Central Database Server (CDS) which has been configured with management functions in respect of the Multi-Layer USB Drive.

Applicant's invention is directed to a Multi-Layer USB Drive comprised of three major portions, an outer housing or case, at least two USB Drive PCBAs and a typical USB connector. The PCBAs (printed circuit board assemblies) are comprised of one or more access and/or control features, including a USB control chip; a USB hub chip; a code generating chip; and various other security chips (such as a fingerprint recognition chip), flash memory, and other parts common to typical USB memory devices and well known in the art. The combination provides added security to the storage regions of second and higher levels of PCBAs in the housing as will be discussed herein.

As a further feature one or more PCBAs include a USB Hub chip to enable the linking of multiple levels within the drive, each level acting as a separate USB drive. A general connector of a type familiar to those skilled in the art is used to physically connect the drives.

Applicant's Multi-Layer USB Drive (MLUD) could also be used for other types of USB storage devices and memory cards such as USB Hard Drives, SD cards, micro SD cards, mini SD cards, MMC cards, MMC micro cards, MS cards, MS Duo cards, CF cards, PCMCIA cards, xD cards, etc.

Advantages

Several advantages have been identified for applicant's Multi-Layer USB Drive (MLUD):
1. Confidential digital data content can be protected physically by storing the data at a higher level of PCBAs requiring that unauthorized users pass through several layers of security to access that sensitive content.
2. The existence of confidential digital data content stored at a level higher than the first level of PCBA can be hidden from users by masking the existence of the higher level PCBAs.
3. The existence of confidential digital data content stored at a level higher than the first level of PCBA can be made difficult to users by including an innocuous icon for accessing higher level PCBAs, so that unauthorized users have difficulty recognizing the icon as an entryway to the higher level PCBAs.
4. With proper configuration of a Code Generating Control (CGC) chip at a level of the PCBA, access to the next higher level can only be accessed upon entry of the code assigned by the CGC.
5. The secured memory and the non-secured memory of the Multi-Layer USB Drive (MLUD) are physically separated, as compared to systems where secured portions are separated from non-secured portions by means of software in the same memory. Thus the secured portion can be physically secured with a greater level of security as compared to software based separation within the same memory.
6. Each PCBA can be configured with different features, including different storage capacities, as desired by the manufacturer. One layer doesn't have to be the same as another in storage capacity. Each layer can be configured as protected or unprotected, thus providing flexibility for configuring the PCBAs of the MLUD.
7. The Multi-Layer USB Drive (MLUD) with a CGC chip can be registered to a central database server (CDS) which could link the MLUD through the Internet or other network. The CDS can be configured to send instructions to securely and remotely delete or update the content of a MLUD. This management function could be designed to control the MLUD on a level by level basis.
8. As the Multi-Layer USB Drive (MLUD) has multiple PCBAs, each PCBA could have different security features such as password protection, fingerprint security, encryption, etc. This can often make it more difficult to access data stored in higher PCBA levels of the MLUD.

In conclusion, as the Multi-Layer USB Drive (MLUD) includes multiple PCBAs, it can be configured with different number of PCBAs, and each PCBA can be configured with different or the same storage size and security features, including the option of having no security feature at a desired PCBA. A CDS can control each PCBA, or any number of them, remotely for flexibility of remote control.

DESCRIPTION OF THE DRAWINGS

FIG. 16 is a schematic view of internal components of the Multi-Layer USB Drive (MLUD) of the present invention with a non-secured storage printed circuit board assembly of FIG. 5 as the initial PCBA and a secured storage printed circuit board assembly of FIG. 4 as a higher level PCBA, connected in series with the assembly of FIG. 4 oriented above the assembly of FIG. 5. Shown schematically is the serial flow of data through the MLUD on access.

FIG. 17 is a schematic view of internal components of the Multi-Layer USB Drive (MLUD) of FIG. 12 with a housing with a fingerprint scanner depicted. Shown schematically is the serial flow of data through the MLUD on access.

FIG. 17-1 is a schematic view of internal components of the Multi-Layer USB Drive (MLUD) of the present invention with a non-secured storage printed circuit board assembly of FIG. 5 as the initial PCBA, a first secured storage printed circuit board assembly of FIG. 4 as a higher level PCBA, a second secured storage printed circuit board assembly of FIG. 4 as a higher level PCBA, and a secured storage printed circuit board assembly of FIG. 9 as yet a higher level PCBA, connected in series with the assembly of FIG. 9 oriented above the two assemblies of FIG. 4 and the two assemblies of FIG. 4 oriented above the assembly of FIG. 5.

FIG. 22 is a schematic view of a screen display showing the control parameters of the printed circuit board assemblies of FIGS. 5 and 9.

DETAILED DESCRIPTION

The present invention provides improved functionality and security to USB memory devices, including USB drives (or USB mobile drives), Memory Stick, Memory Card and other portable data storage drives. Applicant's Multi-Layer USB Drive (MLUD), provides physical security of digital data content with multiple independent and variable security levels among several printed circuit board assemblies.

This Multi-Layer USB Drive (MLUD) will store and secure the sensitive data on the physical hardware Multi-Layer Drives which could have their own independent security functions inside of a USB portable Drive.

FIGS. 1 through 9 are schematic views of internal components of typical prior art USB drives of various configurations, as described herein. The internal components are described herein generally as a printed circuit board assembly (sometimes referred to herein as a PCBA). The PCBA of FIGS. 1 through 9 include the following components common in each printed Circuit board assembly.

Figure 1:
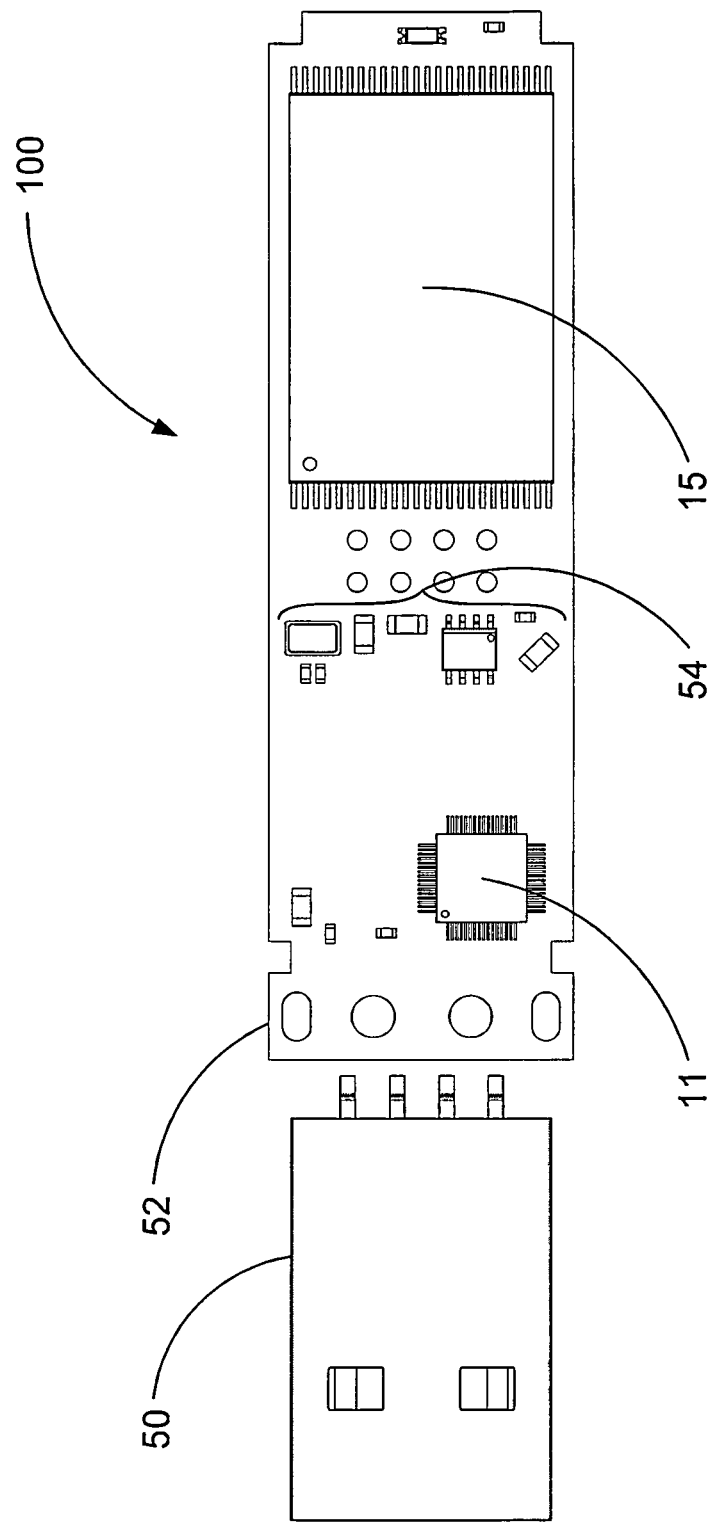
FIG. 1 is a schematic view of internal components of a USB storage device of the prior art with non-secured storage.

Referring to FIG. 1 as an example, USB storage device with PCBA 100 is shown. USB connector 50 is of typical dimension for insertion into the USB port of a computer or other electronic device to permit the flow of data between the USB storage device and the computer or other electronic device. USB connector is connected to the circuit board 52 of PCBA 100 to permit data flow between them. Several additional components 54 required for operability of PCBA 100 are shown generally and schematically, it being understood that those skilled in the art would select appropriate additional components as a matter of routine. It will also be understood that the underside of circuit board 52 (not shown) contains electrical connections to permit electrical communication between components of PCBA 100. PCBA 100 further includes flash memory 15 where data may be received, stored and sent.

Distinctions between the printed circuit board assemblies of FIGS. 1 through 9 will be discussed.

FIG. 1 is a schematic view of internal components of PCBA 100 of the prior art with non-secured storage with non-security USB control chip 11. Data may be stored in and retrieved from flash memory 15 without the user having to pass through security measures on PCBA 100.

Figure 2:
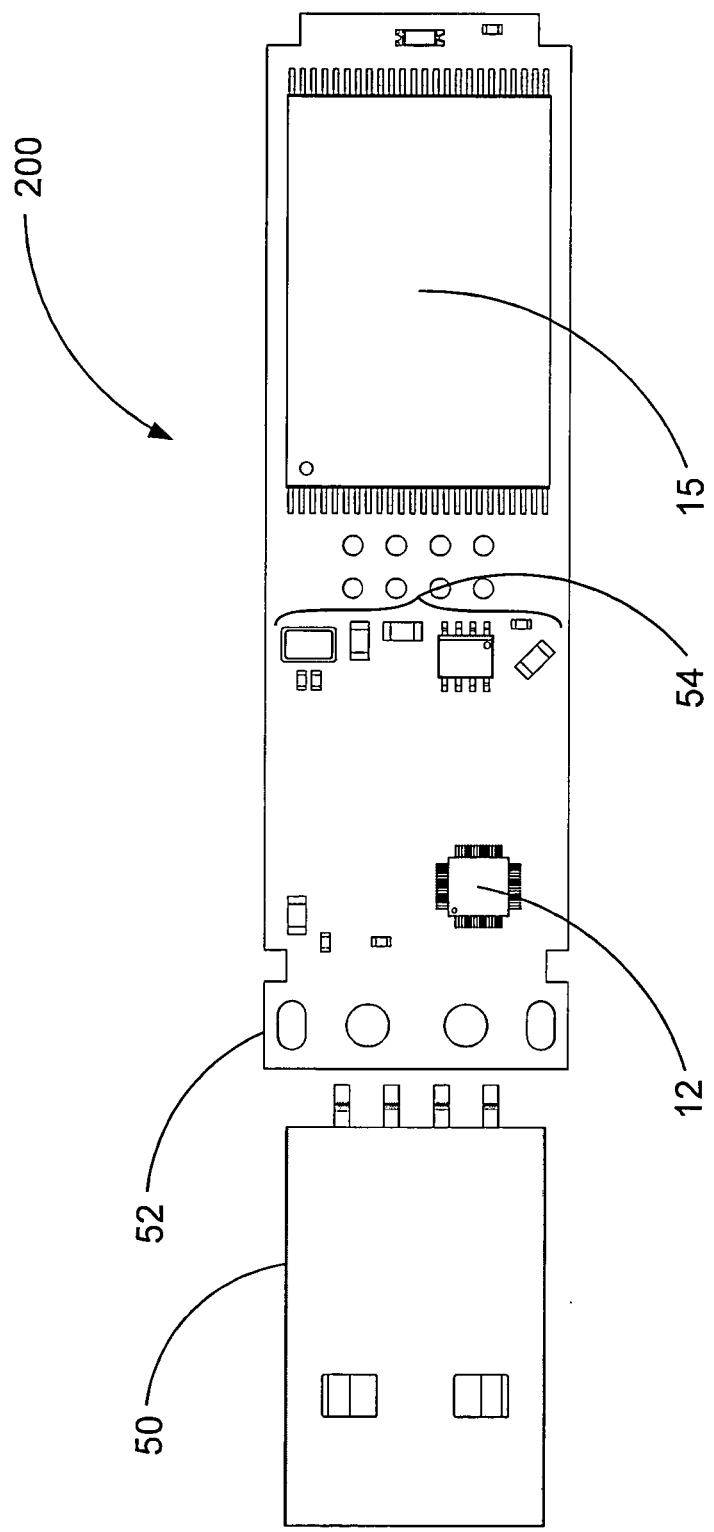
FIG. 2 is a schematic view of internal components of a USB storage device of the prior art with secured storage.

FIG. 2 is a schematic view of internal components of PCBA 200 of the prior art with secured storage by means of security USB control chip 12. Data may only be stored in and retrieved from flash memory 15 by a user who has successfully passed through a security requirement such as a user name and password.

Figure 3:
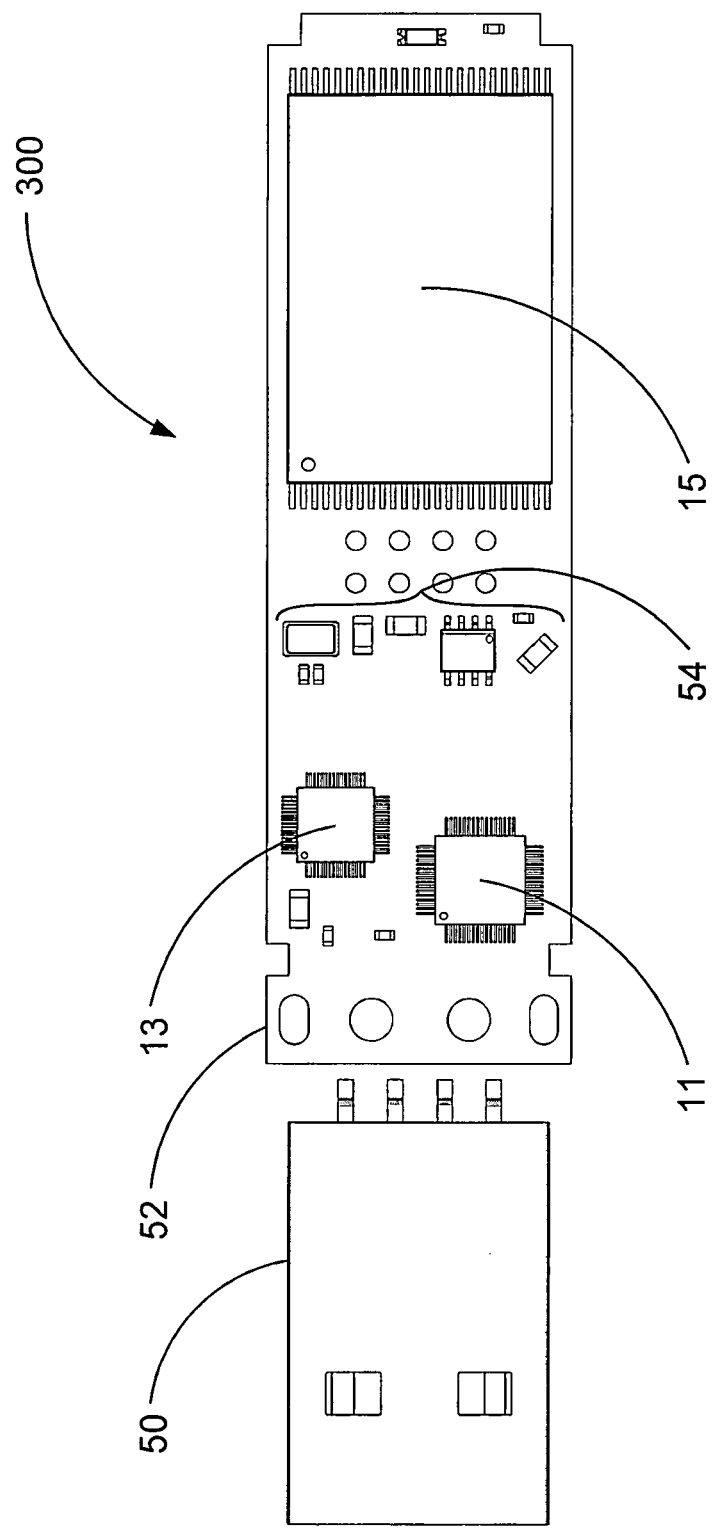
FIG. 3 is a schematic view of internal components of a USB storage device of the prior art with non-secured storage and a code generating chip.

FIG. 3 is a schematic view of internal components of PCBA 300 of the prior art with non-secured storage having non security USB control chip 11 and code generating chip 13. Data may only be stored in and retrieved from flash memory 15 by a user who has successfully passed through security requirement of reproduction of a code generated by the code generating chip 13.

Figure 4:
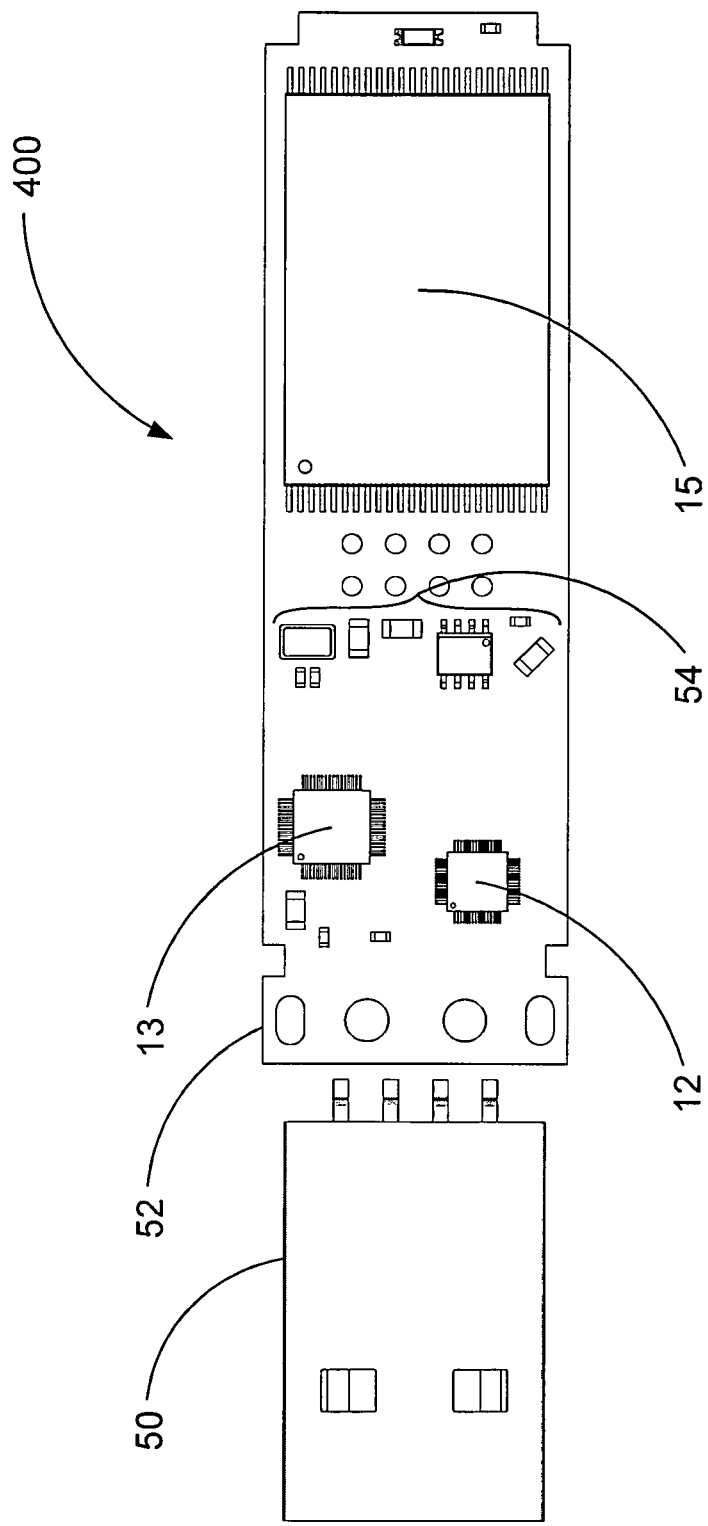
FIG. 4 is a schematic view of internal components of a USB storage device of the prior art with secured storage and a code generating chip.

FIG. 4 is a schematic view of internal components of PCBA 400 of the prior art with secured storage and a code generating chip by means of code generating chip 13 and security USB control chip 12, which control the USB function with security such as, for example encryption or a user name and password. Data may only be stored in and retrieved from flash memory 15 by a user who has successfully passed through both a security requirement of reproduction of a code generated by the code generating chip 13 and a security requirement such as a user name and password.

Figure 5:
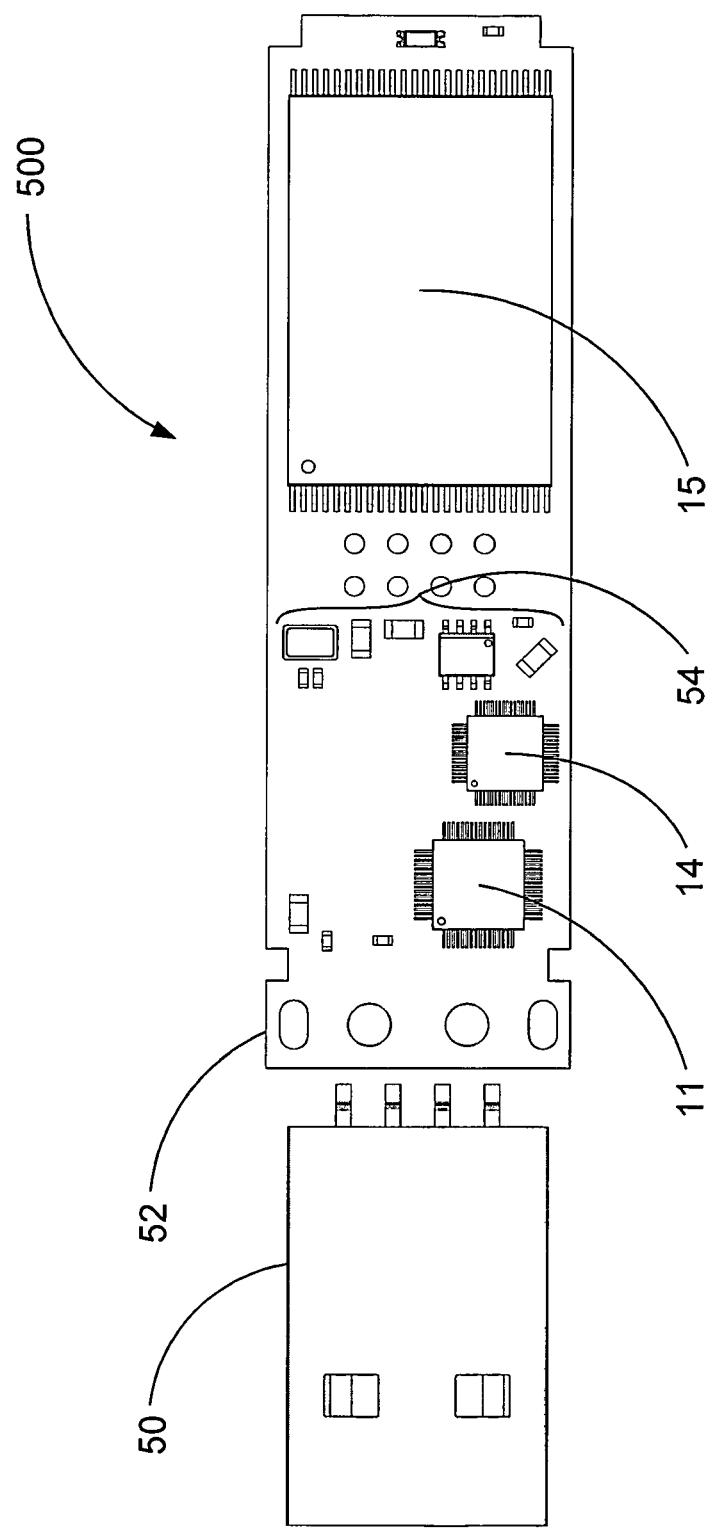
FIG. 5 is a schematic view of internal components of a USB storage device of the prior art with non-secured storage and a USB hub chip.

FIG. 5 is a schematic view of internal components of PCBA 500 of the prior art with non-secured storage and a USB hub chip by means of non-security USB control chip 11, which control the USB function without security. USB hub chip 14 is provided for use in the invention as will be described. Data may be stored in and retrieved from flash memory 15 without the user having to pass through security measures on PCBA 500.

Figure 6:
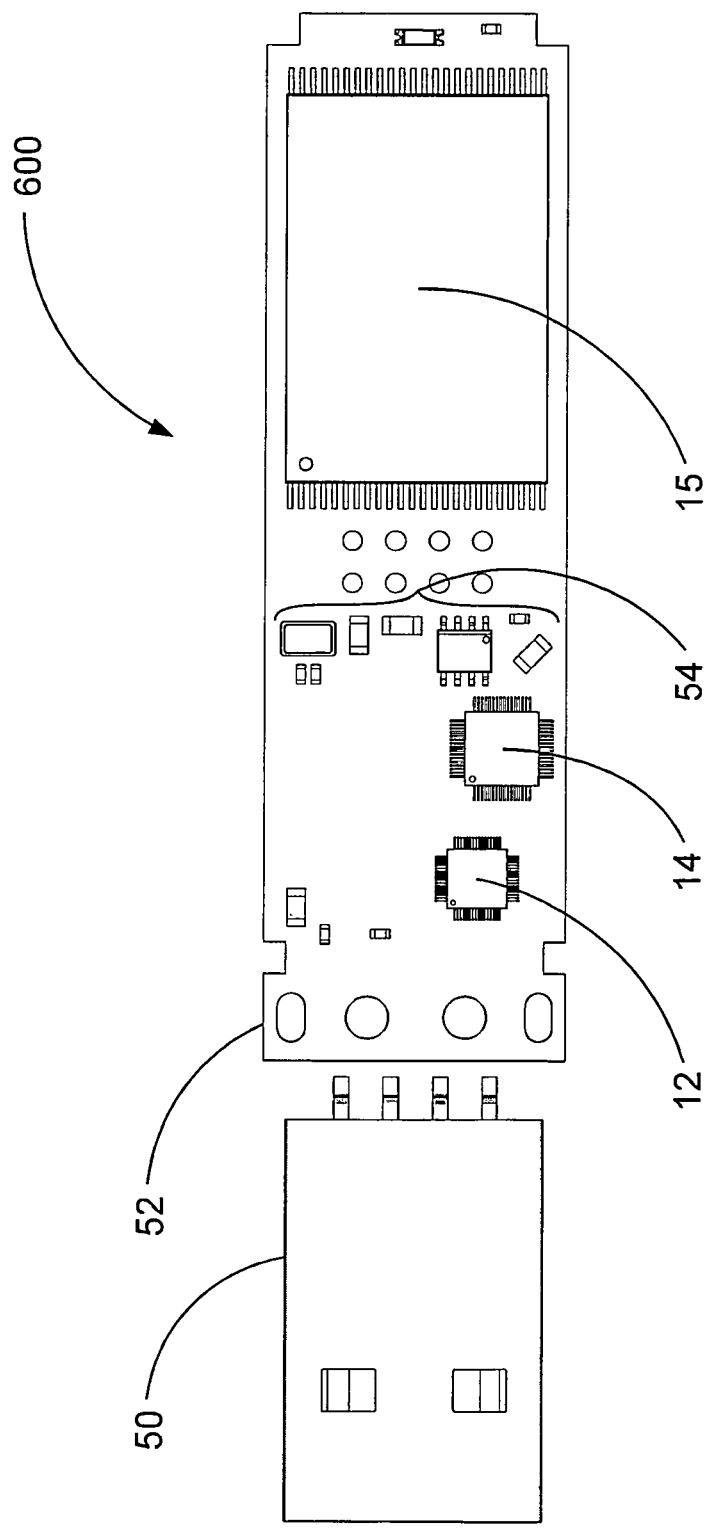
FIG. 6 is a schematic view of internal components of a USB storage device of the prior art with secured storage and a USB hub chip.

FIG. 6 is a schematic view of internal components of PCBA 600 of the prior art with secured storage and a USB hub chip by means of USB hub chip 14 and security USB control chip 12. USB hub chip 14 is provided for use in the invention as will be described. Data may only be stored in and retrieved from flash memory 15 by a user who has successfully passed through a security requirement such as a user name and password.

Figure 7:
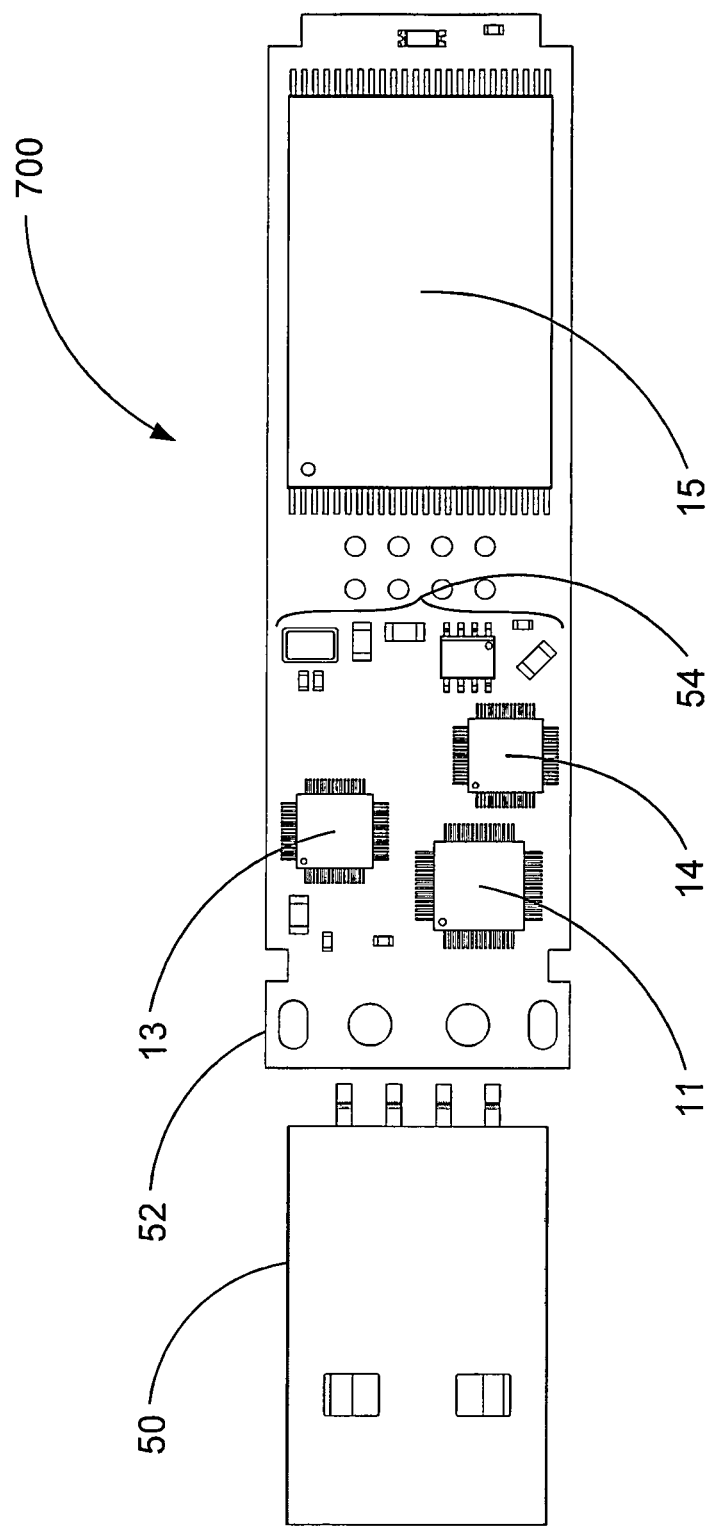
FIG. 7 is a schematic view of internal components of a USB storage device of the prior art with non-secured storage, a USB hub chip and a code generating chip.

FIG. 7 is a schematic view of internal components of PCBA 700 of the prior art with non-secured storage, by means of non-security USB control chip 11, a USB hub chip 14 and a code generating chip 13. USB hub chip 14 is provided for use in the invention as will be described. Data may only be stored in and retrieved from flash memory 15 by a user who has successfully passed through a security requirement of reproduction of a code generated by the code generating chip 13.

Figure 8:
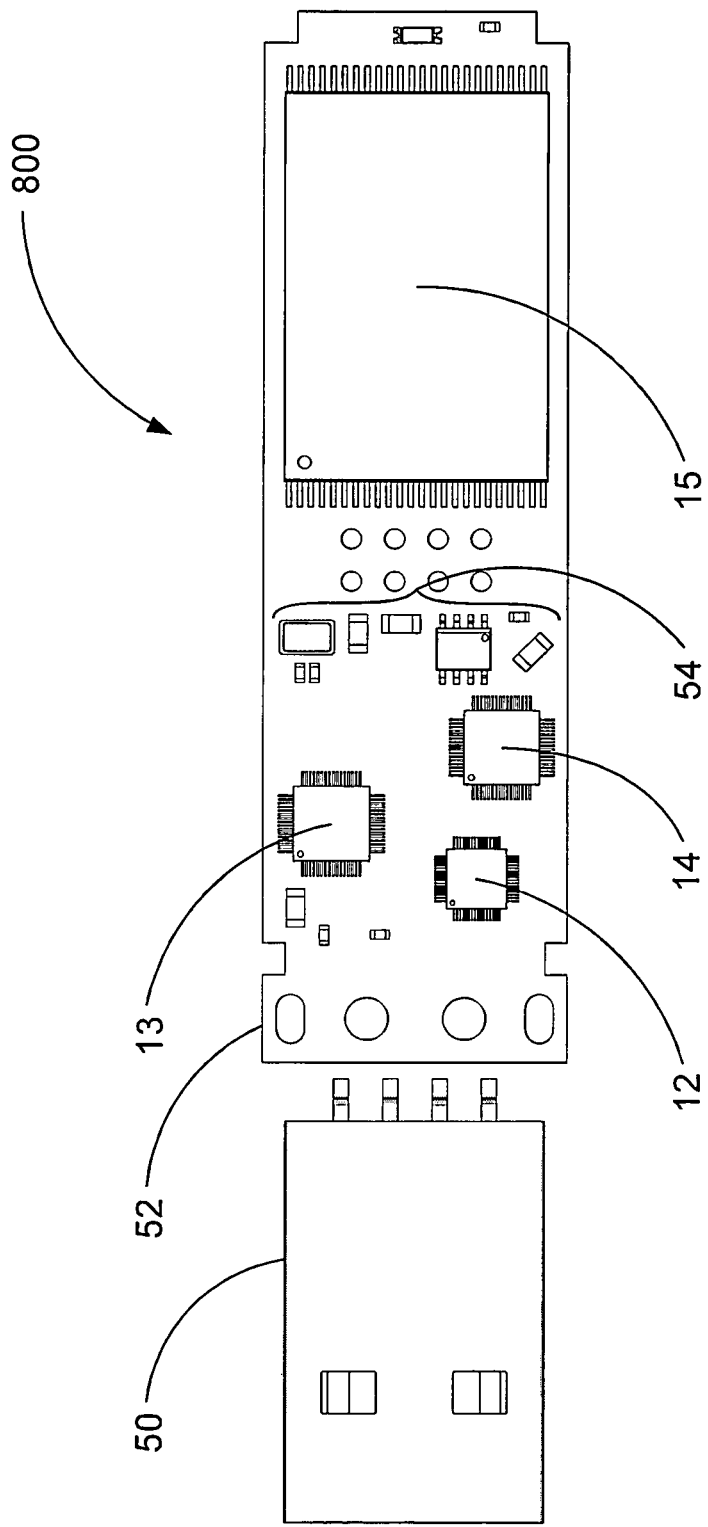
FIG. 8 is a schematic view of internal components of a USB storage device of the prior art with secured storage, a USB hub chip and a code generating chip (CGC)

FIG. 8 is a schematic view of internal components of PCBA 800 of the prior art with secured storage by means of security USB control chip 12, a USB hub chip 14 and a code generating chip 13. USB hub chip 14 is provided for use in the invention as will be described. Data may only be stored in and retrieved from flash memory 15 by a user who has successfully passed through a security requirement of reproduction of a code generated by the code generating chip 13 and who has successfully passed through a security requirement such as a user name and password.

Figure 9:
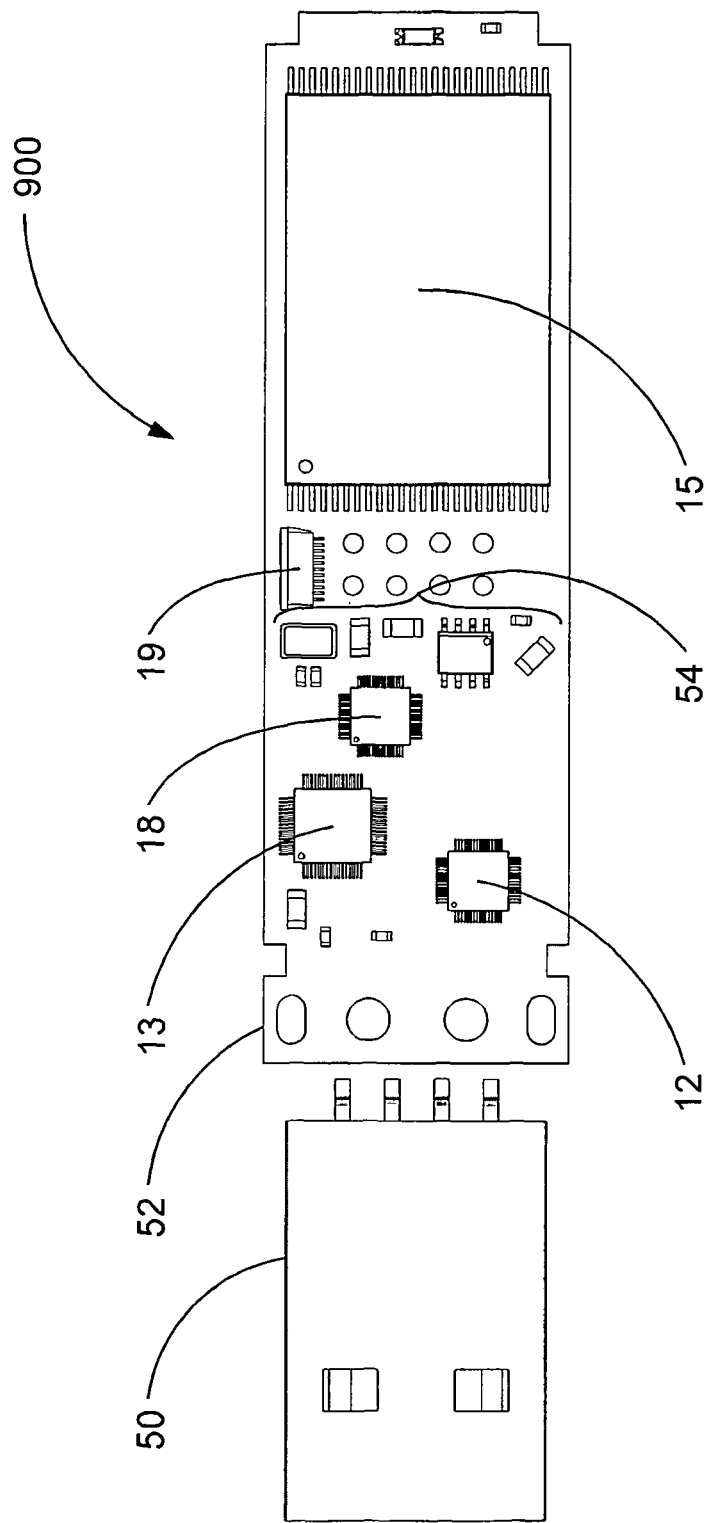
FIG. 9 is a schematic view of internal components of a USB storage device of the prior art with secured storage, a code generating chip, a fingerprint chip, and a fingerprint scanner connector.

FIG. 9 is a schematic view of internal components of PCBA 900 of the prior art with secured storage by means of security USB control chip 12, a code generating chip 13, a fingerprint chip 18, and a fingerprint scanner connector 19. Data may only be stored in and retrieved from flash memory 15 by a user who has successfully passed through a security requirement of reproduction of a code generated by the code generating chip 13, who has successfully passed through a security requirement controlled by the USB control chip 12 such as a user name and password, and by matching a fingerprint using fingerprint chip 18 and a fingerprint scanner connector 19.

A preferred embodiments of applicants invention will now be discussed with reference to FIGS. 10 through 23 based on the USB storage devices of FIGS. 1 through 9.

Figure 10:
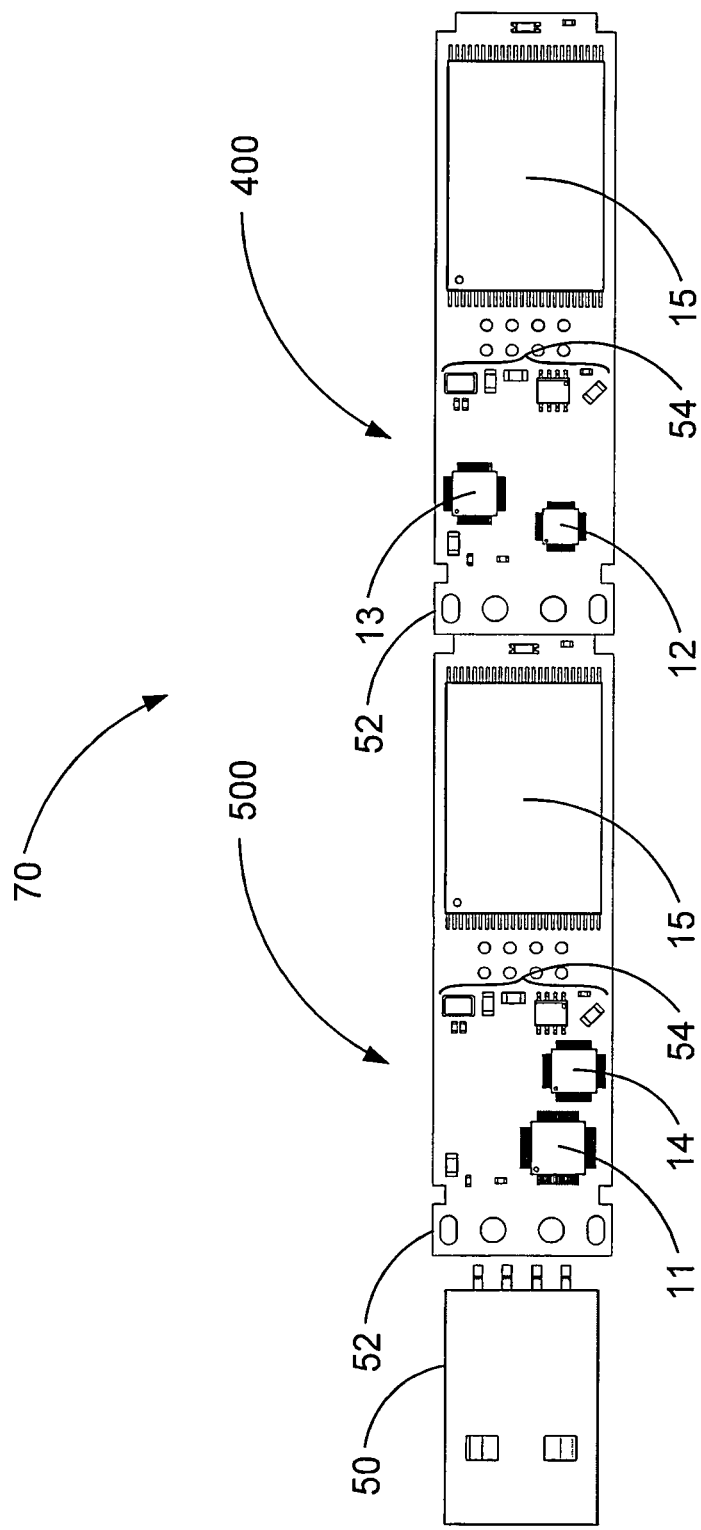
FIG. 10 is a schematic view of internal components of the Multi-Layer USB Drive (MLUD) of the present invention with a non-secured storage printed circuit board assembly of FIG. 5 as the initial PCBA and a secured storage printed circuit board assembly of FIG. 4 as a higher level PCBA, connected in series in side by side orientation.

FIG. 10 is a schematic view of internal components of the Multi-Layer USB Drive (MLUD) 70 of the present invention with a non-secured storage printed circuit board assembly 500 of FIG. 5 as the initial printed circuit board assembly and a secured storage printed circuit board assembly 400 of FIG. 4 as a higher level printed circuit board assembly, connected in series in linear adjacent or end to end orientation. PCBA 500 is connected to USB connector 50 for operative connection to a USB connection of a computer or other electronic device. PCBA 500 has non-secured storage by means of non-security USB control chip or microprocessor 11.

USB hub chip 14 of PCBA 500 expands the single USB connection of USB connector with computer 40 (FIG. 21), or other USB reading electronic device, into multiple USB connections which connect PCBA 500 and 400 of drive 70 together. USB hub chip 14 may also be used in other embodiments to connect further printed circuit board assemblies with one connection between USB connector 50 and computer 40. In addition USB hub chip 14 could provide connection information to control microprocessor 11 of PCBA 500 and to control microprocessor 12 of PCBA 400 to make the microprocessors aware of the existence of PCBA 500 and 400 of drive 70, and optionally prioritize the display of data between them.

A user may obtain data from flash memory 15 without the entry of a password or other security means. PCBA 400 is connected to the end of PCBA 500 opposite to the end connected to connector 50, for exchange of data serially through control chip 11 of PCBA 500. Access to flash memory 15 of PCBA 400 is controlled through USB control chip 12 and code generating chip 13. Data may only be stored in and retrieved from flash memory 15 of PCBA 400 by a user who has successfully passed through a security requirement of reproduction of a code generated by the code generating chip 13 and who has successfully passed through a security requirement controlled by the USB control chip 12, such as a user name and password.

Figure 11:
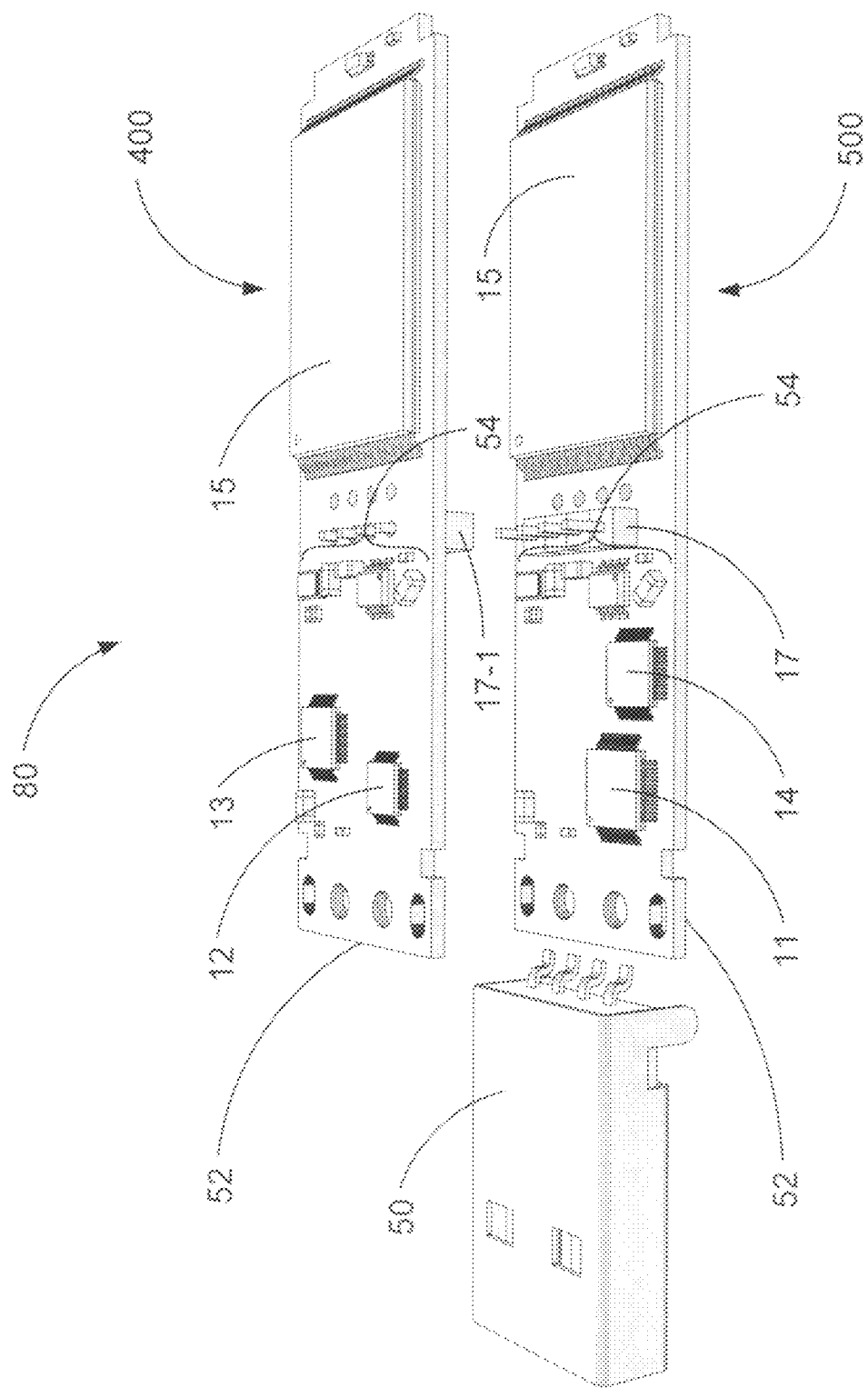
FIG. 11 is a schematic view of internal components of the Multi-Layer USB Drive (MLUD) of the present invention with a non-secured storage printed circuit board assembly of FIG. 5 as the initial PCBA and a secured storage printed circuit board assembly of FIG. 4 as a higher level PCBA, connected in series with the assembly of FIG. 4 oriented above the assembly of FIG. 5.

FIG. 11 is a schematic view of internal components of the Multi-Layer USB Drive (MLUD) 80 of the present invention with a non-secured storage printed circuit board assembly 500 of FIG. 5 as the initial printed circuit board assembly and a secured storage printed circuit board assembly 400 of FIG. 4 as a higher level PCBA, connected in series with the assembly of FIG. 4 oriented above and connected to the assembly of FIG. 5. PCBA 500 is connected to USB connector 50 for operative connection to a USB connection of a computer or other electronic device. PCBA 500 has non-secured storage by means of non-security USB control chip or microprocessor 11.

USB hub chip 14 of PCBA 500 expands the single USB connection of USB connector with computer 40 (FIG. 21), or other USB reading electronic device, into multiple USB connections which connect PCBA 500 and 400 of drive 80 together. USB hub chip 14 may also be used in other embodiments to connect further printed circuit board assemblies with one connection between USB connector 50 and computer 40. In addition USB hub chip 14 could provide connection information to control microprocessor 11 of PCBA 500 and to control microprocessor 12 of PCBA 400 to make the microprocessors aware of the existence of PCBA 500 and 400 of drive 80, and optionally prioritize the display of data between them.

A user may obtain data from flash memory 15 without the entry of a password or other security means. PCBA 400 is connected to PCBA 500 in general alignment above PCBA 500 with operative electrical connection for exchange of data serially through control chip 11 of PCBA 500. PCBA 400 has a female pin 17-1 and PCBA 500 has a male pin 17 for operative connection to female pin 17-1 of PCBA 400. Male pin 17 of PCBA 500 is connected to female pin 17-1 of PCBA 400 to both secure PCBA 500 to PCBA 400 and also provide an electrical connection for exchange of data between controller 11 of PCBA 500 and controller 12 of PCBA 400. Access to flash memory 15 of PCBA 400 is controlled through USB control chip 12 and code generating chip 13. Data may only be stored in and retrieved from flash memory 15 of PCBA 400 by a user who has successfully passed through a security requirement of reproduction of a code generated by the code generating chip 13 and who has successfully passed through a security requirement controlled by the USB control chip 12, such as a user name and password.

Figure 12:
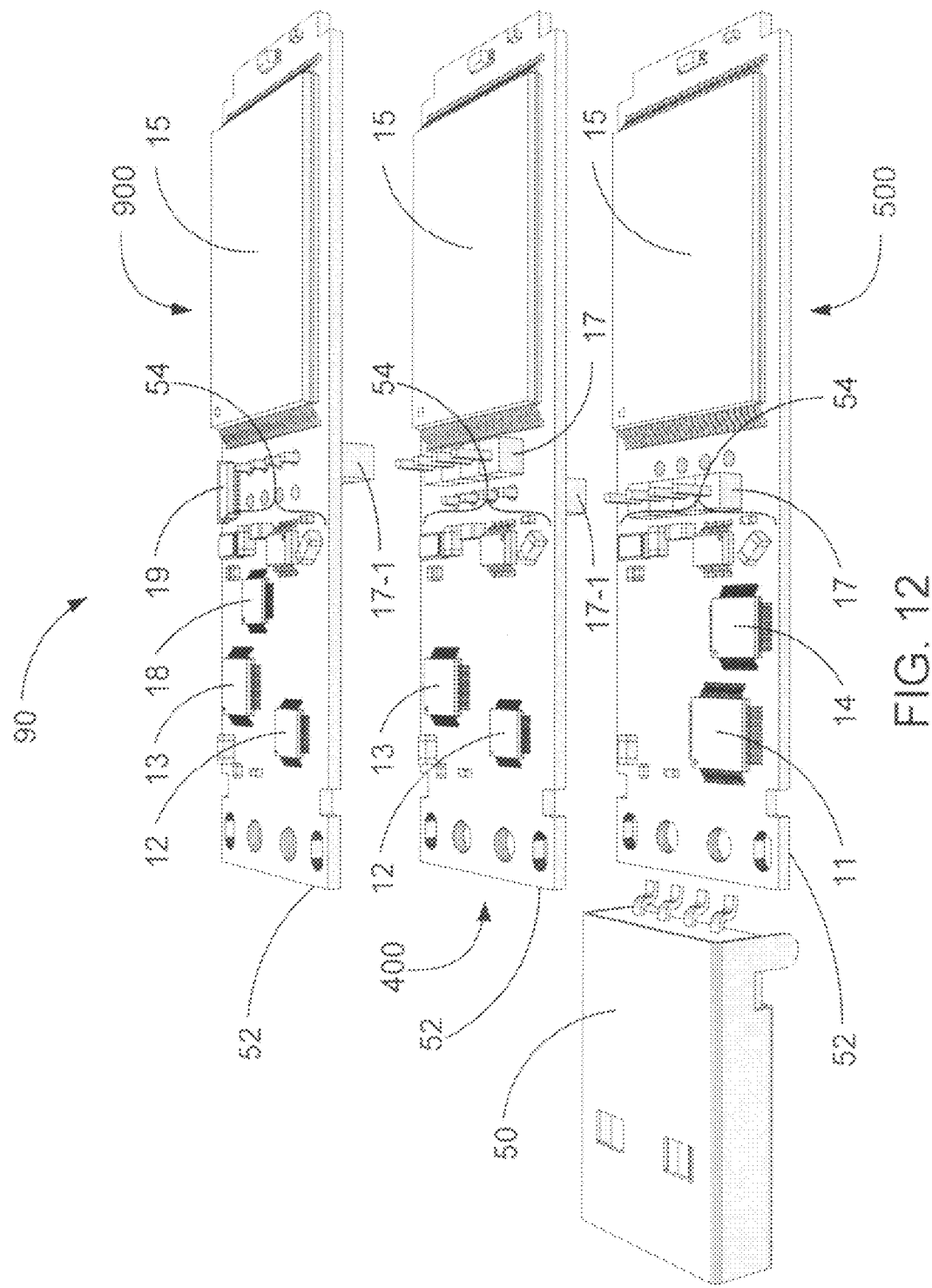
FIG. 12 is a schematic view of internal components of the Multi-Layer USB Drive (MLUD) of the present invention with a non-secured storage printed circuit board assembly of FIG. 5 as the initial PCBA, a secured storage printed circuit board assembly of FIG. 4 as a higher level PCBA, and a secured storage printed circuit board assembly of FIG. 9 as yet a higher level PCBA, connected in series with the assembly of FIG. 9 oriented above the assembly of FIG. 4 and the assembly of FIG. 4 oriented above the assembly of FIG. 5.

FIG. 12 is a schematic view of internal components of the Multi-Layer USB Drive (MLUD) 90 of the present invention with a non-secured storage printed circuit board assembly 500 depicted in FIG. 5 as the initial printed circuit board assembly, a secured storage printed circuit board assembly of PCBA 400 depicted in FIG. 4 as a higher level PCBA, and a secured storage printed circuit board assembly of PCBA 900 depicted in FIG. 9 as yet a higher level PCBA, connected in series with the assembly of FIG. 9 oriented above and connected to the assembly of FIG. 4 and the assembly of FIG. 4 oriented above and connected to the assembly of FIG. 5. The connection and operations of devices 500 and 400 are the same as discussed above with respect to FIG. 11.

However USB hub chip 14 of PCBA 500 expands the single USB connection of USB connector with computer 40 (FIG. 21), or other USB reading electronic device, into multiple USB connections which connect PCBA 500, 400 and 900 of drive 90 together. USB hub chip 14 may also be used in other embodiments to connect further printed circuit board assemblies with one connection between USB connector 50 and computer 40. In addition USB hub chip 14 could provide connection information to control microprocessor 11 of PCBA 500, to control microprocessor 12 of PCBA 400 and to control microprocessor 12 of PCBA 900 to make the microprocessors aware of the existence of PCBA 500, 400 and 900 of drive 90, and optionally prioritize the display of data between them.

PCBA 900 is connected to PCBA 400 in general alignment above PCBA 400 with operative electrical connection for exchange of data serially through microprocessor 12 of PCBA 400. PCBA 400 has two pins, male pin 17 and female pin 17-1 and PCBA 900 has a female pin 17-1. Male pin 17 of PCBA 400 is connected to female pin 17-1 of PCBA 900 to both secure PCBA 900 to PCBA 400 and also provide an electrical connection for exchange of data between microprocessor 12 of PCBA 400 and microprocessor 12 of PCBA 900. Data may only be stored in and retrieved from flash memory 15 of PCBA 900 by a user who has successfully passed through a security requirement of reproduction of a code generated by the code generating chip 13 of PCBA 900, and who has successfully passed through a security requirement controlled by the USB control chip 12 of PCBA 900 such as a user name and password, and by matching a fingerprint using fingerprint chip 18 and a fingerprint scanner connector 19, both of PCBA 900.

As an option with a code generating chip 13, user authentication could be verified without memory access. Further the generated code could be stored at the USB control chip 12 at the same time as in memory. The USB Control Chip 12 and Code Generating Chip 13 of PCBA 900 could do a cross check between the two chips, thereby providing additional security.

Figure 13:
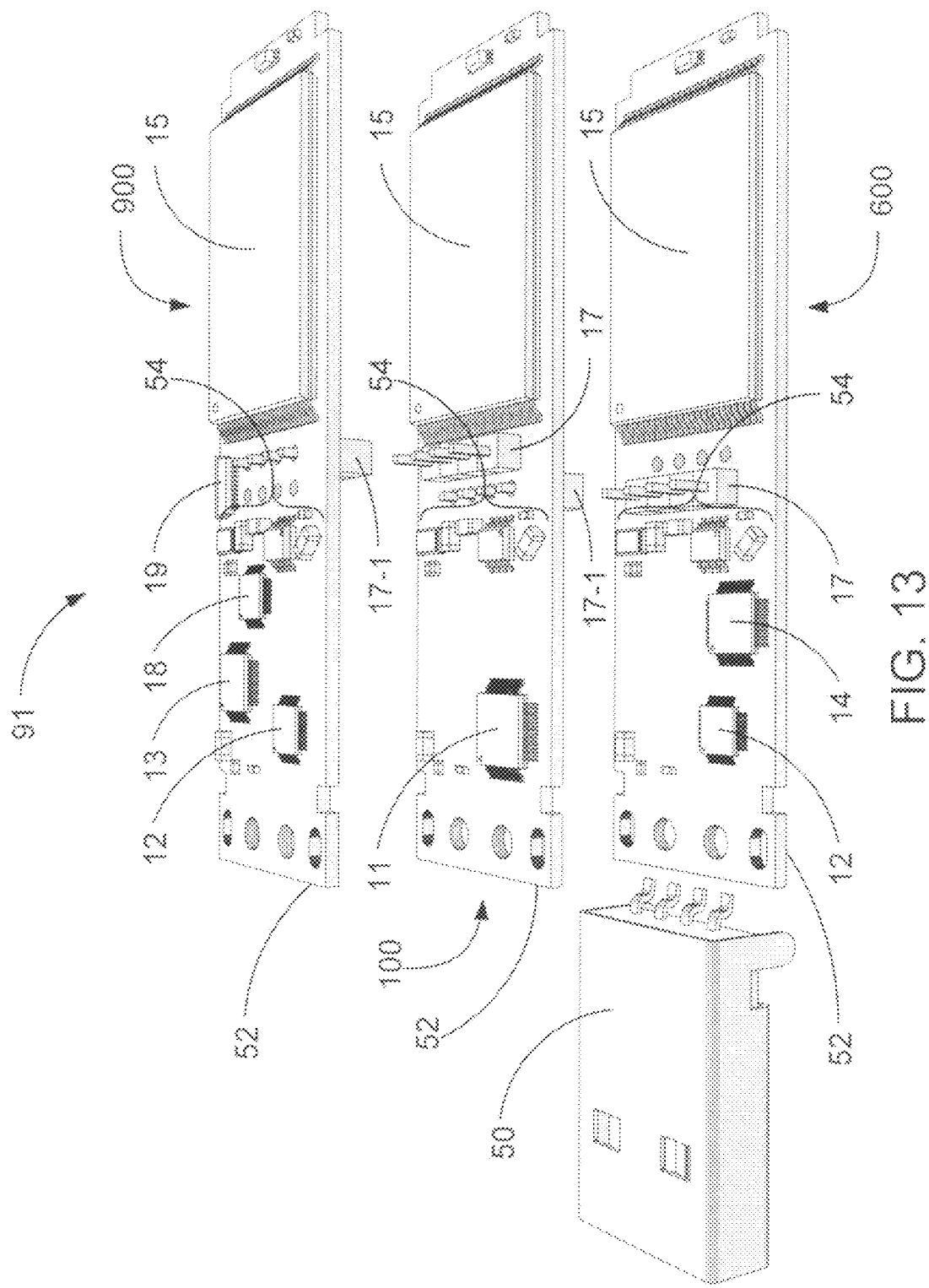
FIG. 13 is a schematic view of internal components of the Multi-Layer USB Drive (MLUD) of the present invention with a secured storage printed circuit board assembly of FIG. 6 as the initial PCBA, a non-secured storage printed circuit board assembly of FIG. 1 as a higher level PCBA, and a secured storage printed circuit board assembly of FIG. 9 as yet a higher level PCBA, connected in series with the assembly of FIG. 9 oriented above the assembly of FIG. 1 and the assembly of FIG. 1 oriented above the assembly of FIG. 6.

FIG. 13 is a schematic view of internal components of the Multi-Layer USB Drive (MLUD) 91 of the present invention with a secured storage printed circuit board assembly of PCBA 600 depicted in FIG. 6 as the initial printed circuit board assembly, a non-secured storage printed circuit board assembly of PCBA 100 depicted in FIG. 1 as a higher level PCBA, and a secured storage printed circuit board assembly of PCBA 900 depicted in FIG. 9 as yet a higher level PCBA, connected in series with the assembly of FIG. 9 oriented above and connected to the assembly of FIG. 1 and the assembly of FIG. 1 oriented above and connected to the assembly of FIG. 6. PCBA 600 is connected to USB connector 50 for operative connection to a USB connection of a computer or other electronic device.

PCBA 100 is connected to PCBA 600 in general alignment above PCBA 600 with operative electrical connection for exchange of data serially through control chip 12 of PCBA 600. PCBA 100 has a female pin 17-1 and PCBA 600 has a male pin 17 for operative connection to female pin 17-1 of PCBA 100. Male pin 17 of PCBA 600 is connected to female pin 17-1 of PCBA 100 to both secure PCBA 600 to PCBA 100 and also provide an electrical connection for exchange of data between controller 12 of PCBA 600 and controller 11 of PCBA 100. Access to flash memory 15 of PCBA 100 is controlled through USB control chip 11. Data may only be stored in and retrieved from flash memory 15 of PCBA 100 by a user who has successfully passed through a security requirement controlled by the USB control chip 12 of PCBA 600, such as a user name and password. No additional control for access to flash memory 15 of PCBA 100 is required as PCBA 100 is controlled by non-secure controller 11.

PCBA 900 is connected to PCBA 100 in general alignment above PCBA 100 with operative electrical connection for exchange of data serially through control chip 11 of PCBA 100. PCBA 100 has two pins, male pin 17 and female pin 17-1 and PCBA 900 has a female pin 17-1. Male pin 17 of PCBA 100 is connected to female pin 17-1 of PCBA 900 to both secure PCBA 900 to PCBA 100 and also provide an electrical connection for exchange of data between controller 11 of PCBA 100 and controller 12 of PCBA 900. Data may only be stored in and retrieved from flash memory 15 of PCBA 900 by a user who has successfully passed through a security requirement controlled by the USB control chip 12 of PCBA 600, and a user who has successfully passed through a security requirement controlled by the USB control chip 12 of PCBA 900 such as a user name and password, and by matching a fingerprint using fingerprint chip 18 and a fingerprint scanner connector 19, both of PCBA 900.

USB hub chip 14 of PCBA 600 expands the single USB connection of USB connector with computer 40 (FIG. 21), or other USB reading electronic device, into multiple USB connections which connect PCBA 600, 100 and 900 of drive 91 together. USB hub chip 14 may also be used in other embodiments to connect further printed circuit board assemblies with one connection between USB connector 50 and computer 40. In addition USB hub chip 14 could provide connection information to control microprocessor 12 of PCBA 600, to control microprocessor 11 of PCBA 100 and to control microprocessor 12 of PCBA 900 to make the microprocessors aware of the existence of PCBA 600, 100 and 900 of drive 91, and optionally prioritize the display of data between them.

Figure 14:
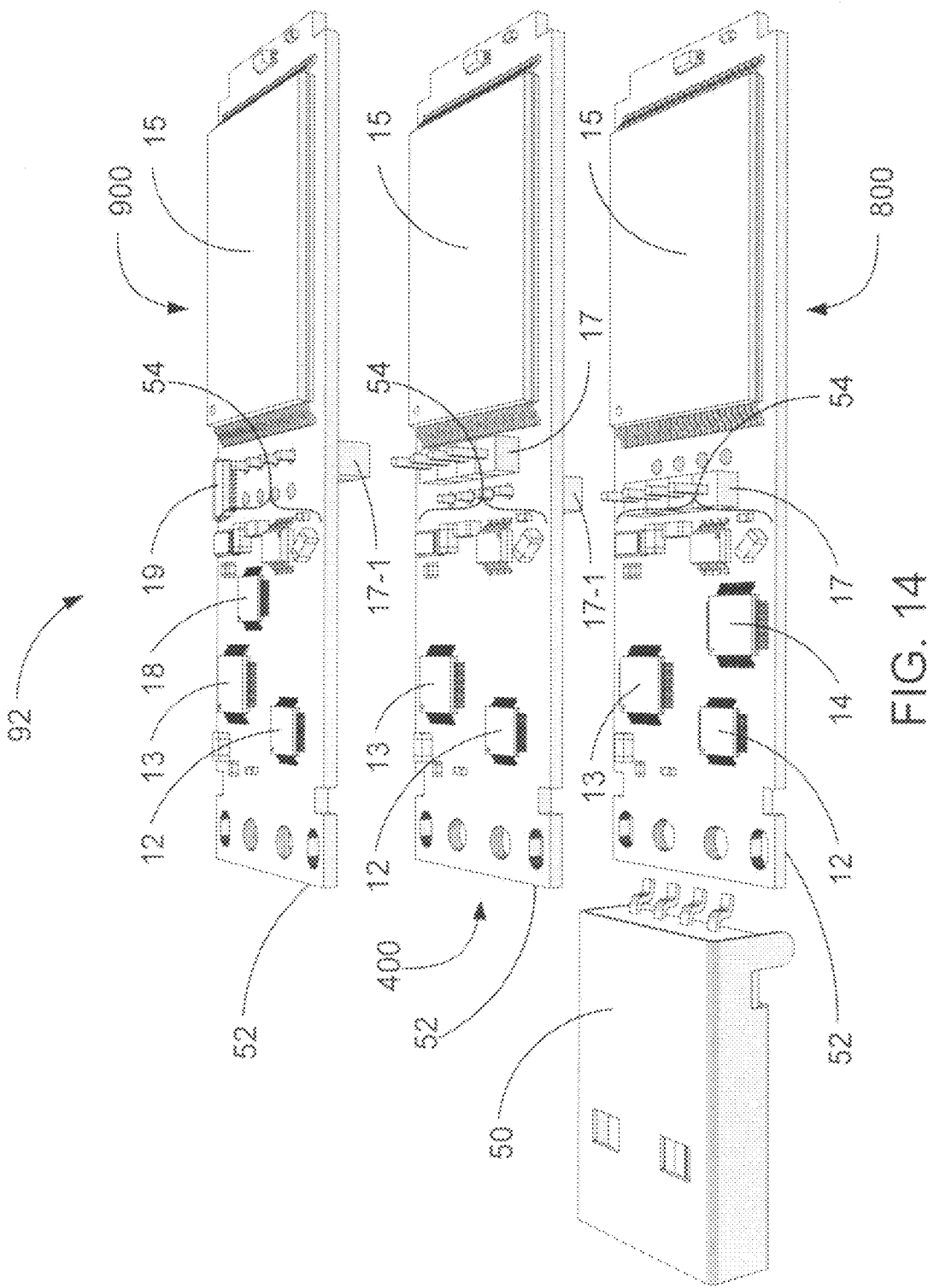
FIG. 14 is a schematic view of internal components of the Multi-Layer USB Drive (MLUD) of the present invention with a secured storage printed circuit board assembly of FIG. 8 as the initial PCBA, a secured storage printed circuit board assembly of FIG. 4 as a higher level PCBA, and a secured storage printed circuit board assembly of FIG. 9 as yet a higher level PCBA, connected in series with the assembly of FIG. 9 oriented above the assembly of FIG. 4 and the assembly of FIG. 4 oriented above the assembly of FIG. 8.

FIG. 14 is a schematic view of internal components of the Multi-Layer USB Drive (MLUD) 92 of the present invention with a secured storage printed circuit board assembly of PCBA 800 depicted in FIG. 8 as the initial PCBA, a secured storage printed circuit board assembly of PCBA 400 depicted in FIG. 4 as a higher level PCBA, and a secured storage printed circuit board assembly of PCBA 900 depicted in FIG. 9 as yet a higher level PCBA, connected in series with the assembly of FIG. 9 oriented above and connected to the assembly of FIG. 4 and the assembly of FIG. 4 oriented above and connected to the assembly of FIG. 8. PCBA 800 is connected to USB connector 50 for operative connection to a USB connection of a computer or other electronic device.

PCBA 400 is connected to PCBA 800 in general alignment above PCBA 800 with operative electrical connection for exchange of data serially through control chip 12 of PCBA 800. PCBA 400 has a female pin 17-1 and PCBA 800 has a male pin 17 for operative connection to female pin 17-1 of PCBA 400. Male pin 17 of PCBA 800 is connected to female pin 17-1 of PCBA 400 to both secure PCBA 800 to PCBA 400 and also provide an electrical connection for exchange of data between controller 12 of PCBA 800 and controller 12 of PCBA 400. Access to flash memory 15 of PCBA 400 is controlled through USB control chip 12 and code generating chip 13 of PCBA 800. Data may only be stored in and retrieved from flash memory 15 of PCBA 400 by a user who has successfully passed through the security requirements of PCBA 800, that being reproduction of a code generated by the code generating chip 13 and the security requirement controlled by the USB control chip 12, such as a user name and password.

PCBA 900 is connected to PCBA 400 in general alignment above PCBA 400 with operative electrical connection for exchange of data serially through control chip 12 of PCBA 400. PCBA 400 has two pins, male pin 17 and female pin 17-1 and PCBA 900 has a female pin 17-1. Male pin 17 of PCBA 400 is connected to female pin 17-1 of PCBA 900 to both secure PCBA 900 to PCBA 400 and also provide an electrical connection for exchange of data between controller 12 of PCBA 400 and controller 12 of PCBA 900. Data may only be stored in and retrieved from flash memory 15 of PCBA 900 by a user who has successfully passed through the security requirements controlled by PCBA 800, then the security requirements controlled by PCBA 400, and then a user who has successfully passed through the security requirement controlled by the USB control chip 12 of PCBA 900. The security requirements of PCBA 800 are reproduction of a code generated by the code generating chip 13 and the security requirement controlled by USB control chip 12, such as a user name and password. The security requirements of PCBA 400 are reproduction of a code generated by the code generating chip 13 and the security requirement controlled by the USB control chip 12, such as a user name and password. The security requirements of PCBA 900 are reproduction of a code generated by the code generating chip 13, the security requirement controlled by the USB control chip 12, such as a user name and password, and by matching a fingerprint using fingerprint chip 18 and a fingerprint scanner connector 19.

USB hub chip 14 of PCBA 800 expands the single USB connection of USB connector with computer 40 (FIG. 21), or other USB reading electronic device, into multiple USB connections which connect PCBA 800, 400 and 900 of drive 92 together. USB hub chip 14 may also be used in other embodiments to connect further printed circuit board assemblies with one connection between USB connector 50 and computer 40. In addition USB hub chip 14 could provide connection information to control microprocessor 12 of PCBA 800, to control microprocessor 12 of PCBA 400 and to control microprocessor 12 of PCBA 900 to make the microprocessors aware of the existence of PCBA 800, 400 and 900 of drive 92, and optionally prioritize the display of data between them.

Figure 15:
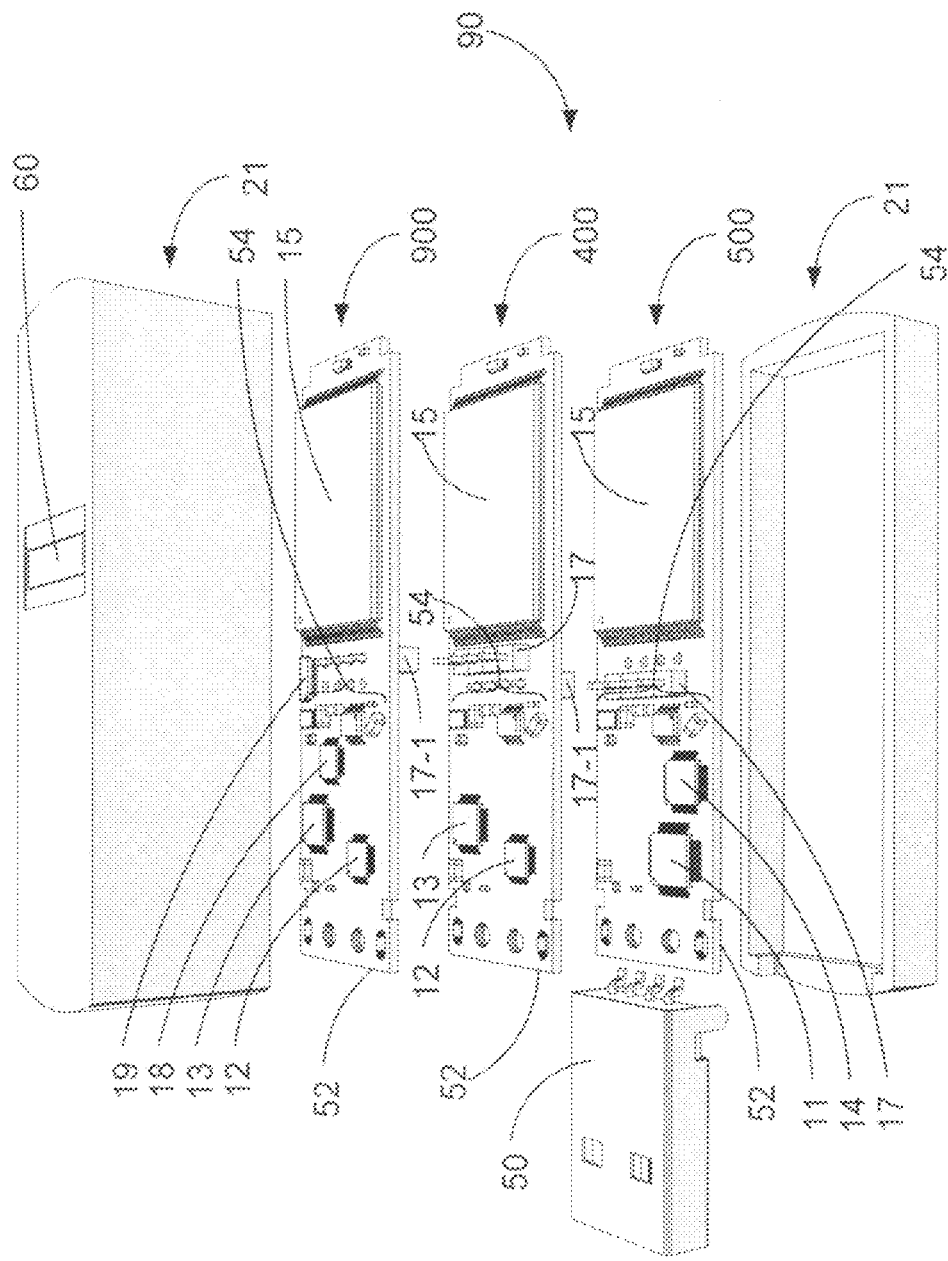
FIG. 15 is a schematic view of internal components of the Multi-Layer USB Drive (MLUD) of FIG. 12 with a housing with a fingerprint scanner depicted.

FIG. 15 is a schematic view of internal components of the Multi-Layer USB Drive (MLUD) 90 with an outer housing 21. It includes non-secured storage printed circuit board assembly depicted in FIG. 12 together with an outer housing 21 and a fingerprint scanner 60. All components of FIG. 12, namely the printed circuit board assemblies 500, 400 and 900 fit within housing 21 and are not visible from the outside of housing 21 when in normal use. Devices 500, 400 and 900 are configured, connected and operate as discussed above with respect to FIG. 12. Fingerprint scanner 60 is operatively connected to fingerprint scanner connector 19 which is connected in turn to fingerprint chip or microprocessor 18.

As printed circuit board assemblies of devices 400 and 900 both have a code generating chip 13 they can each have a unique code. If they have their own unique code, they could have their own cross checking security function between USB Control Chip 12 and Code Generating Chip 13 of each PCBA 400 and 900. And also when connected to central database server 30 as in FIG. 21, the central database server 30 can consider each PCBA 400 and 900 as independent USB Drives. Central database server 30 could manage devices 400 and 900 with different levels of security.

FIG. 16 is a schematic view of internal components of the Multi-Layer USB Drive (MLUD) 80 of the present invention as discussed above with reference to FIG. 11, with a non-secured storage printed circuit board assembly 500 of FIG. 5 as the initial printed circuit board assembly and a secured storage printed circuit board assembly 400 of FIG. 4 as a higher level PCBA, connected in series with the assembly of FIG. 4 oriented above the assembly of FIG. 5. Shown schematically is the serial flow of data through the MLUD on access by a user. Data enters the Multi-Layer USB Drive (MLUD) through USB connector 50 and is directed to non-secure control chip 11 to access data from, or store data to, flash memory 15 of PCBA 500. A user can also access secure control microprocessor 12 of PCBA 400 on the input of an access step with access to flash memory 15 of PCBA 400 controlled by security. The security requirements of PCBA 400 are reproduction of a code generated by the code generating chip 13 and the security requirement controlled by the USB control chip 12, such as a user name and password.

FIG. 17 is a schematic view of internal components of the Multi-Layer USB Drive (MLUD) 90 of the present invention as discussed above with reference to FIG. 12, with a non-secured storage printed circuit board assembly of PCBA 500 of FIG. 5 as the initial PCBA, a secured storage printed circuit board assembly of PCBA 400 of FIG. 4 as a higher level PCBA, and a secured storage printed circuit board assembly of PCBA 900 depicted in FIG. 9 as yet a higher level PCBA, connected in series with the assembly of FIG. 9 oriented above and connected to the assembly of FIG. 4 and the assembly of FIG. 4 oriented above and connected to the assembly of FIG. 5. Shown schematically is the serial flow of data through the MLUD on access by a user, together with an outer housing 21 and a fingerprint scanner 60. The flow of data through USB connector 50, PCBA 500 and PCBA 400 are as discussed above with reference to FIG. 16. Data may only be stored in and retrieved from flash memory 15 of PCBA 900 by a user who has successfully passed through a security requirement of reproduction of a code generated by the code generating chip 13 of PCBA 900, and who has successfully passed through a security requirement controlled by the USB control chip 12 of PCBA 900 such as a user name and password, and by matching a fingerprint using fingerprint chip 18 and a fingerprint scanner connector 19, both of PCBA 900. Data to flash memory 15 of PCBA 900 flows from USB connector 50, non-secure controller 11 of PCBA 500, secure controller 12 of PCBA 400 and secure controller 12 of PCBA 900 to flash memory 15 of PCBA 900.

Referring to FIG. 16, when the Multi-Layer USB Drive (MLUD) is connected to a Computer 40, the Computer 40 recognizes and sees only the printed circuit board assembly of PCBA 500. And after the user accesses the printed circuit board assembly of PCBA 500, the user can see an icon of the printed circuit board assembly of PCBA 400. To access the data on memory 15 of PCBA 500, it would be not require any security because PCBA 500 is not secured. When the user tries to access the data on memory 15 of PCBA 400, as it has Security USB Chip 12, the user will have to pass through security, such as a password. If the password is not correct, then the user cannot access the data on memory 15 of PCBA 400.

Referring to FIG. 17, a further level of printed circuit board assembly of PCBA 900 is provided, which has security USB chip 12, code generating chip 13 and fingerprint chip 18. To access the data in memory 15 of PCBA 900, the user must first go through PCBA 500. PCBA 500 does not require the security for access. While accessing PCBA 500, a user may be aware of a visible icon or other means of accessing the next level of printed circuit board assembly This could be by clicking an icon on the screen for access to PCBA 400. When a user accesses the data in memory 15 of PCBA 400, the user must pass through security controlled by secure USB control chip 12, such as a user name and password. Upon access to PCBA 400, the user may be aware of an visible icon or other means of accessing the next level of printed circuit board assembly. This could be by clicking an icon on the screen for access to PCBA 900. PCBA 900 includes the fingerprint scanning security and will require a user to scan his/her fingerprint for access to printed circuit board assembly of PCBA 900. If the fingerprint scanner recognises the user's fingerprint as authorised for access, then the user can the data in memory 15 of PCBA 900. This process is an implementation of serialised data access. Users must access all lower levels before access can be granted for the next higher level.

And as a further example with reference to FIG. 17-1, the Multi-Layer USB Drives (MLUD) 90 of printed circuit board assemblies 500, 400, 400, and 900 are connected using Pin 17 and Pin 17-1. And PCBA 500 is a non-secured storage Drive with USB hub chip 14, and the printed circuit board assemblies 400 and 900 have a secured storage each with a code generating chip 13. As an example, the user could configure the printed circuit board assemblies as follows. The data at the Multi-Layer USB Drive (MLUD) of PCBA 500 could be accessed by anybody when they plug the USB Drive into the Computer 40.

The data at the next level Multi-Layer USB Drive (MLUD) of PCBA 400 (first instance) could be accessed by clicking of an icon on the computer screen showing PCBA 500 information, and requiring a password. In addition this Data in the memory 15 of PCBA 500 could be configured, for example, as: "print permitted", "edit permitted", "copy prohibited", "email prohibited".

The data at the next level of PCBA 400 (second instance) could be accessed by clicking of an icon on the computer screen for prior PCBA 400, requiring a password. And also the data of that next level drive of PCBA 400 (second occurrence) could be configured, for example as: "print permitted", "edit permitted", "copy permitted", "email prohibited".

The data at the next level of PCBA 900 could be accessed by clicking of an icon on the computer screen for prior PCBA 400 (second instance), and require another password. And in addition it could require fingerprint verification by fingerprint chip 18. And also the in memory 15 of PCBA 900 could be configured such that all such data is "Ready Only" and "Copy Prohibited".

In conclusion to access to the data of PCBA 900 in this configuration, the user is required to go through password protection three times (400→400→900) and one fingerprint scan verification for PCBA 900. And even with access the data in memory 15 of PCBA 900 is "Ready Only" and "Copy Prohibited".

And further if the generated codes from PCBA 400 (first instance), PCBA 400 (second occurrence) and PCBA 900 are registered to central database server 30, central database server 30 can report as to who/when/what data was accessed. And central database server 30 could upload requested Data to a designated Multi-Layer USB Drive (MLUD), and also delete data at the Multi-Layer USB Drive (MLUD).

With other printed circuit board assembly combinations, the user could configure the complete Multi-Layer USB Drives (MLUD) in other ways.

Figure 18:
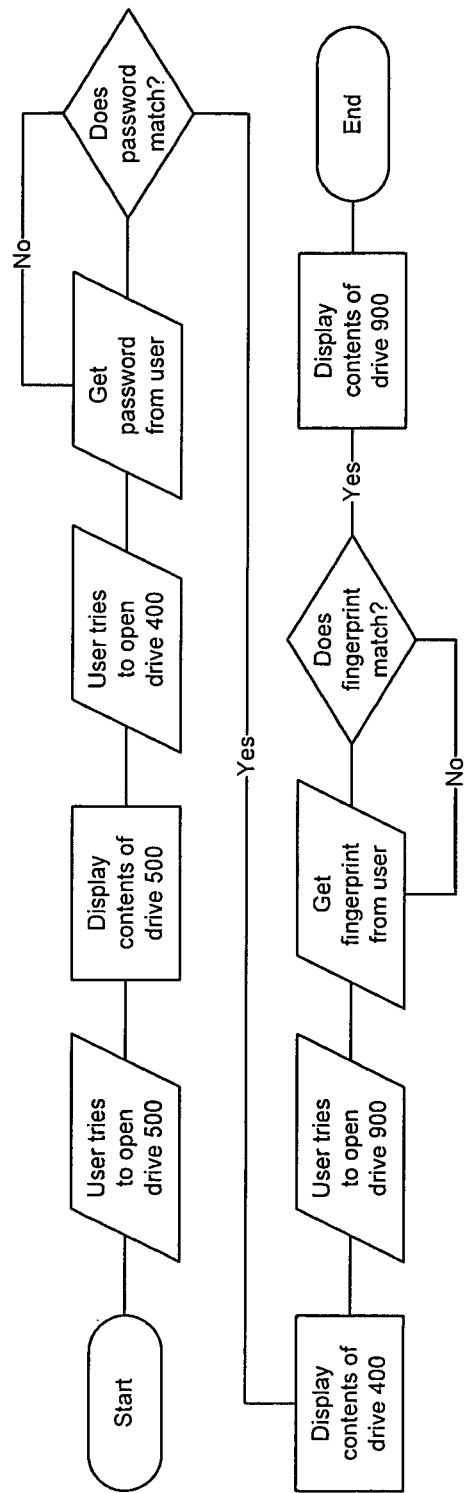
FIG. 18 is a Flow Chart of the Serialized Data Access flow of Multi-Layer USB Drive (MLUD) of FIG. 17.

FIG. 18 is a flow chart of the serialized data access flow of Multi-Layer USB Drive (MLUD) of FIG. 17.

Figure 19:
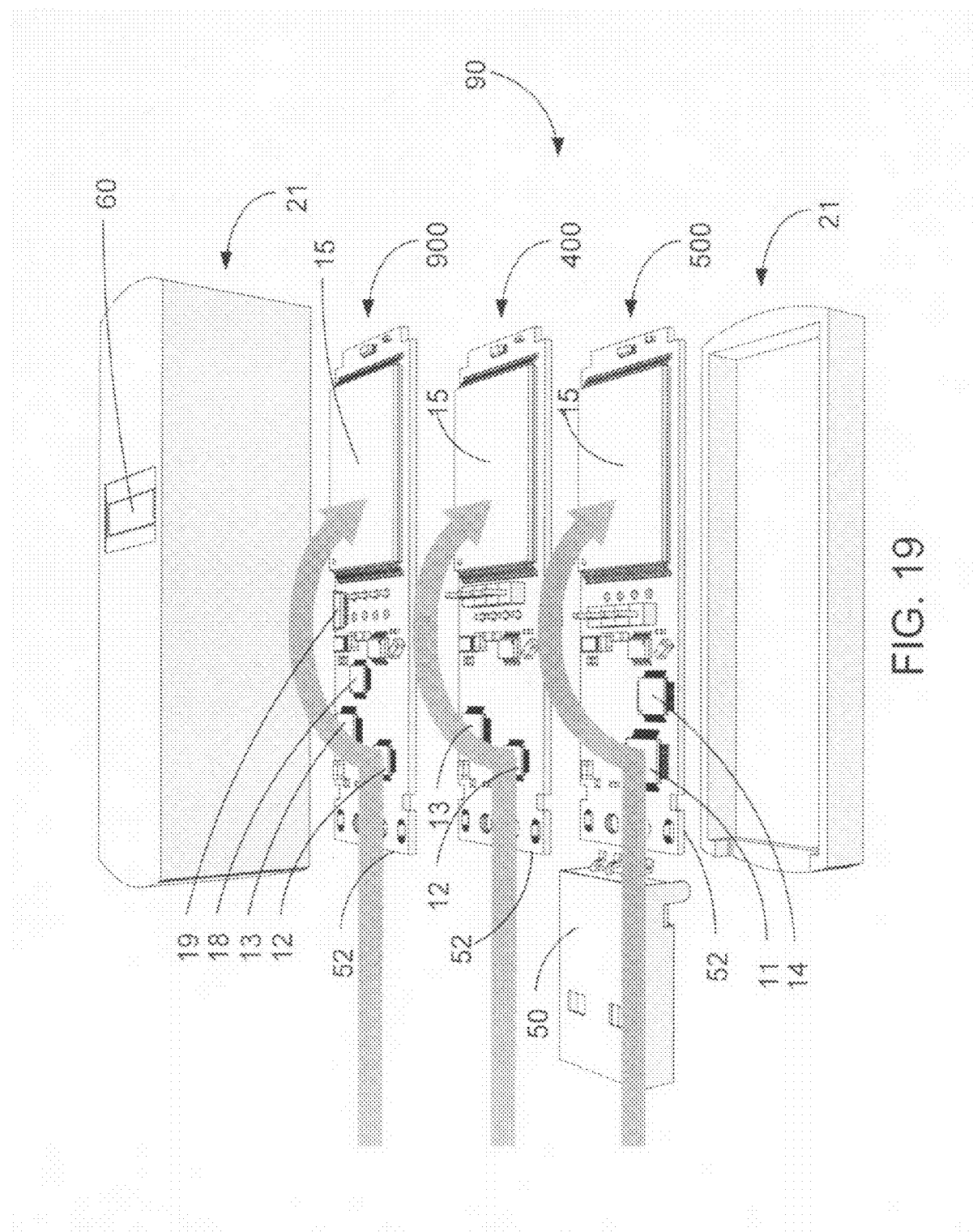
FIG. 19 is schematic view of internal components of the Multi-Layer USB Drive (MLUD), with a non-secured storage printed circuit board assembly of FIG. 5, a secured storage printed circuit board assembly of FIG. 4, and a secured storage printed circuit board assembly of FIG. 9, connected in parallel with the USB connector.

FIG. 19 is schematic view of internal components of the Multi-Layer USB Drive (MLUD), with a non-secured storage printed circuit board assembly of FIG. 5, a secured storage printed circuit board assembly of FIG. 4, and a secured storage printed circuit board assembly of FIG. 9, connected in parallel with USB connector 50.

Figure 20:
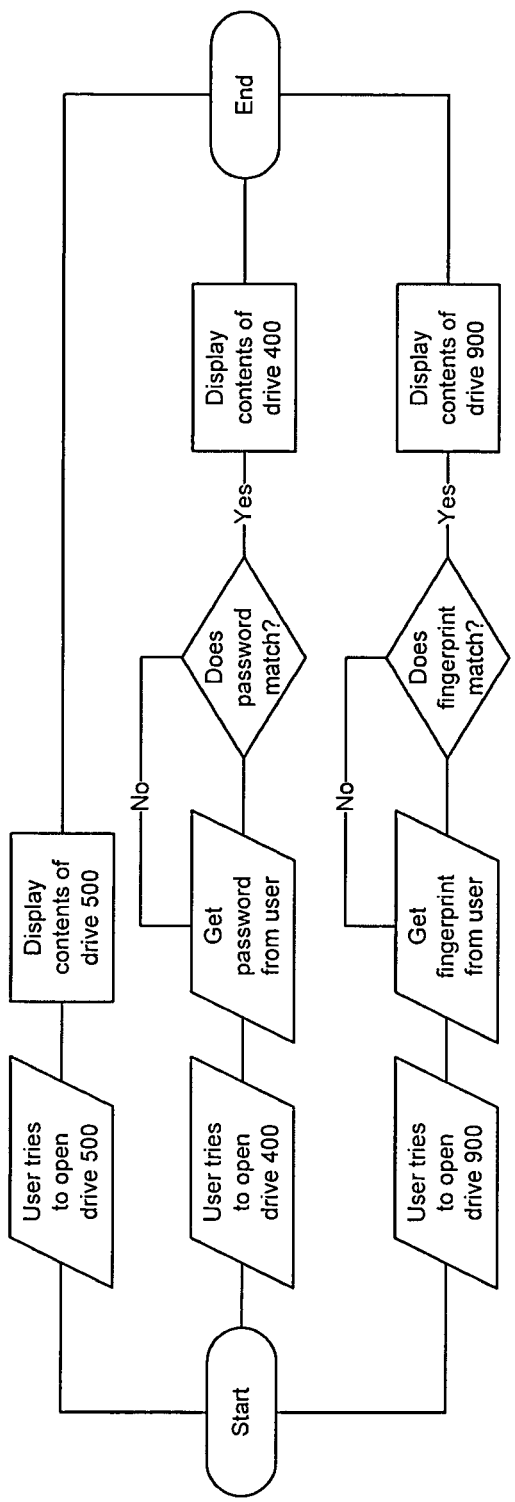
FIG. 20 is a Flow Chart of the Parallelized Data Access flow of Multi-Layer USB Drive (MLUD) of FIG. 19.

FIG. 20 is a flow chart of the parallelized data access flow of Multi-Layer USB Drive (MLUD) of FIG. 19.

Figure 21:
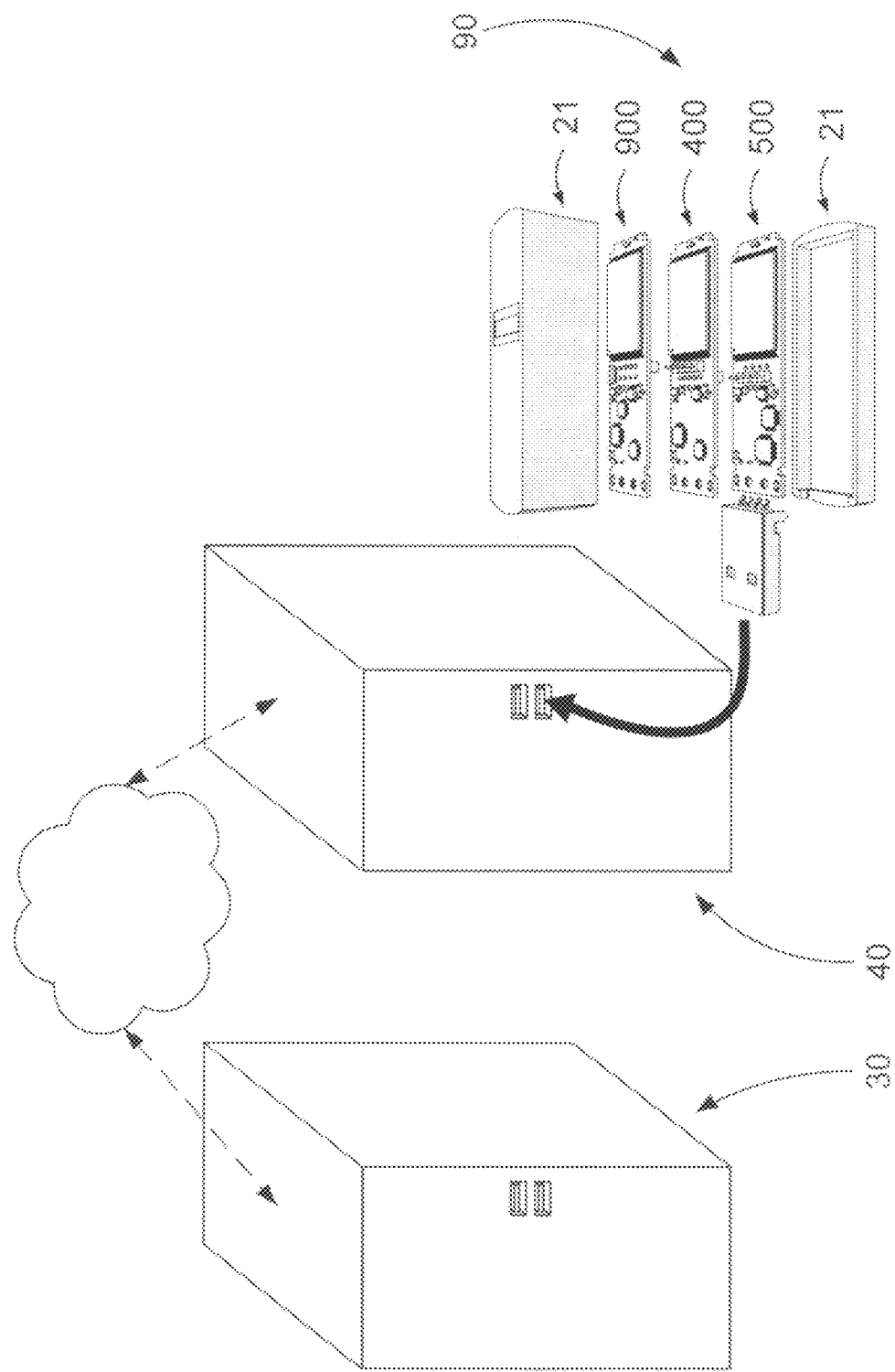
FIG. 21 is schematic view of internal components of the Multi-Layer USB Drive (MLUD) of FIG. 17 for operative connection with a central database server to control the Multi-Layer USB Drive (MLUD) of FIG. 17 and its function, through wired or remote connection.

FIG. 21 is schematic view of internal components of the Multi-Layer USB Drive (MLUD) of FIG. 17 for operative connection with a central database server to control the Multi-Layer USB Drive (MLUD) of FIG. 17 and its function, through wired or remote connection.

FIG. 22 is a schematic view of a screen display showing the control parameters of the printed circuit board assemblies of FIGS. 5 and 9 combined as in a Multi-Layer USB Drive (MLUD) of the present invention.

Figure 23:
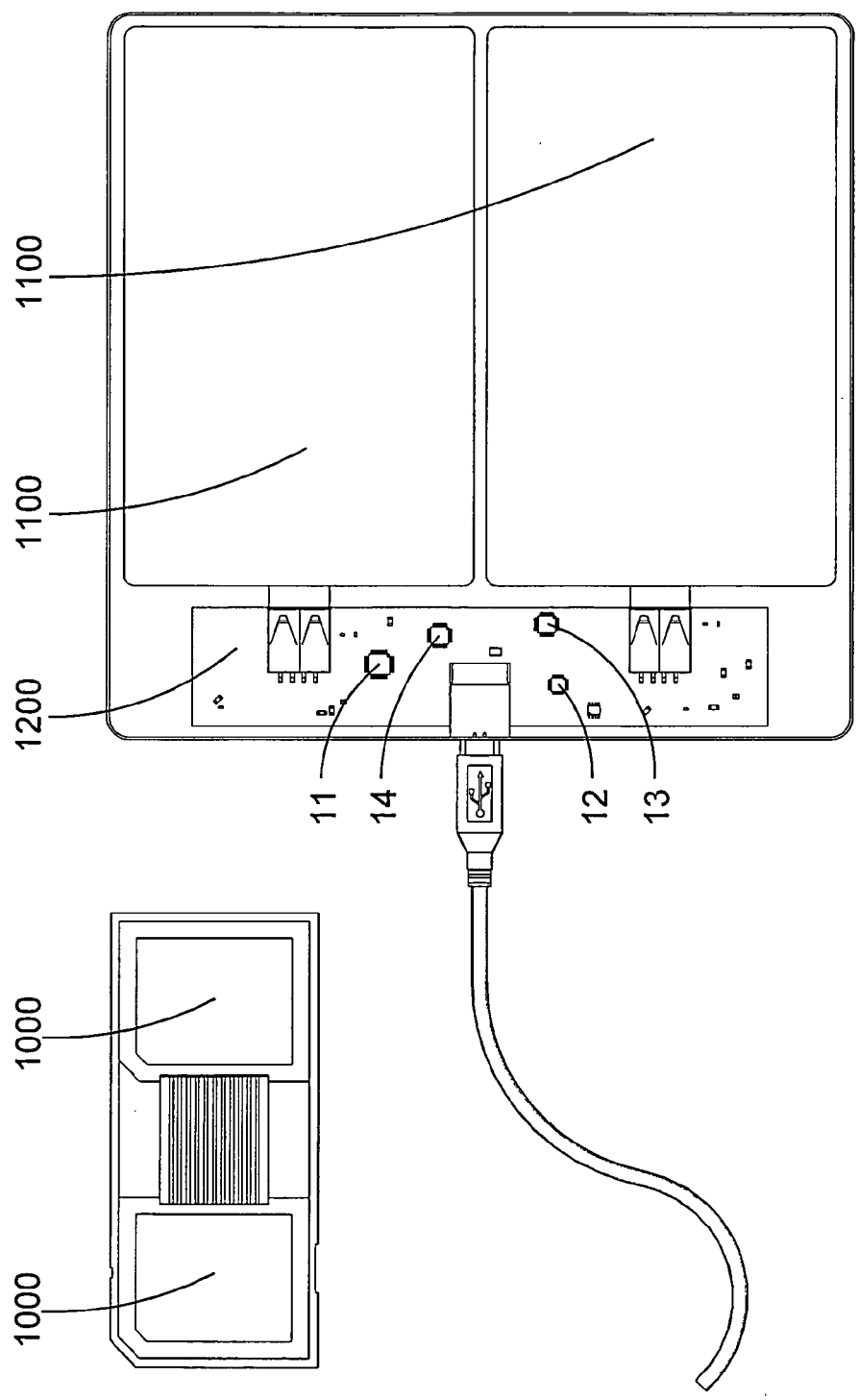
FIG. 23 are two schematic views of alternate exemplary storage systems to which the invention can be applied, an SD card with two flash storage drives and a portable hard drive with two hard disk storage drives.

FIG. 23 are two schematic views of alternate exemplary storage systems to which the invention can be applied, an SD card with two flash storage drives and a portable hard drive with two flash storage drives. In each embodiment the drives (in one labelled 1000 and in the other labelled 1100) are connected serially with one drive being the initial drive and the other a drive at the next level. Operation is the generally similar as discussed with respect to FIGS. 11 and 16 herein.

Several different types of security options are available for each printed circuit board assembly such as Password, Encryption, Fingerprint Recognition, DRM (Digital Rights Management), Security Tokens, Data Masking, Anti-Virus, etc.

Additional printed circuit board assemblies could be added as long as there is sufficient room within housing 21.

As an option one code generating chip 13 could be included in one Multi-Layer USB Drive (MLUD) configured to receive instructions from computer 40 to effect all PCBA' in the MLUD, by having the code the same for all PCBAs of the MLUD. This one command, for example to "delete all data", sent from computer 14 would affect all PCBA of the MLUD, for example to delete all data from all PCBAs in the MLUD. Alternatively, if so configured commands from computer 40 could act on a specific PCBA of the MLUD, or some but not all PCBAs, or each one separately. In that case, computer 40 (which may be a central database server) manages the PCBAs in the manner indicated.

FIG. 21 depicts of the process diagram of Central Database Server 30 and its function which could be connected remotely with Multi-Layer USB Drive (MLUD) 90 through a computer 40. The remote connection method could be through Internet (TCP/IP; Transmission Control Protocol/Internet Protocol) or other communication method. On printed circuit board assembly 500 or other printed circuit board assembly 400 and 900 which have Code Generating Chip 13, it will generate a unique code which could be identified by central database server 30. This unique code could be normal Serial number or MAC (Media Access Control)/IP address type of code when the Code Generating Chip 13 has the function of Networking. Also this Code Generating Chip 13 will contain the IP address of Central Database Server 30, and could initialize the connection with Central Database Server 30 through TCP/IP communication when it is available.

The Code from the Code Generating Chip 13 could have several functions depend on the design. This Code is to identify the Multi-Layer USB Drive (MLUD). This Code stores at the exact Multi-Layer USB Drive (MLUD) USB Control Chip 12 and the Code Generating Chip 13. When the user is trying to access the Data in the Flash Memory 15, the Data Access on the Multi-Layer USB Drive (MLUD) should be asked for the Code to identify the authentication first by USB Control Chip 12. And it is option to double check on the Code Generating Chip 13. If the Code entered is different to the Code in USB Control Chip, then the Access should be denied. If the Code entered is correct, then USB Control Chip could ask one more time to check with Code Generating Chip 13. If there is right feedback from the Code Generating Chip 13, then user could access the Data. This double checking concept could improve the security of Multi-Layer USB Drive (MLUD). And this Code concept could be used for different functions such as Remote Data Access by Network, Wireless explained on FIG. 20, Rule management for the Drive including Copy permit, Print permit, Email permit, Lock, Deletion and so on. This management options could be configured to each Multi-Layer USB Drive (MLUD) independently if they have different Codes.

It should be understood that the code generated by code generating chip 13 performs an important function in identifying authorized access and permitted data communication as described with respect to FIG. 21. It is also important to store the code on USB Control Chip 12, not on in the data of flash memory 15 to prevent unauthorized user from accessing the code by bypassing controller 12 to the database level or flash memory. It will also prevent an unauthorized user from physically removing the flash memory 15, installing it on another USB control chip and accessing the data, as the flash memory could be operated only with a control chip which has the same code. The user can then be verified by USB control chip 12 before the user is permitted to accesses the data.

Each of devices 400 and 900 could have their own unique code by means of code generating chip 13 on each of devices 400 and 900. As such each PCBA 400 and 900 could be set up with its one unique set of access rules. For example PCBA 400 could be configured for print permission, no copying permitted and no e-mailing permitted. And as an example PCBA 900 could be configured for print permission, copying permitted and emailing permitted. Also this could be managed by the central database server 30 as displayed in FIG. 22 as an example. On the other hand, as alternative option, devices 400 and 900 could have the same code, and then could be managed with the same rules.

After the confirmation of the identification between the Multi-Layer USB Drive (MLUD) and central database server 30, central database server 30 could manage the Multi-Layer USB Drive (MLUD) remotely. The functions of central database server 30 could have functions controlling Upload/Download the data between Multi-Layer USB Drive (MLUD) and Server 30, remote locking up, deletion and recovery, etc. This could also include secure message communication, to the authorized user of the Multi-Layer USB Drive (MLUD). FIG. 21 shows the flow of data.

FIG. 23 depicts exemplary types of other USB Drives which could implement the subject invention, such as Memory Cards, SD card, micro SD card, mini SD card, MMC card, MMC micro card, MS card, MS Duo card, CF card, PCMCIA card, xD card, etc. A Multi-Layer SD Card could have several SD Card module PCBAs 1000 which could have different security functions. A Multi-HDD (Hard Disk Drive) Mobile USB Drive could have several HDD 1100 which could have different security functions through a Control module 1200 which has Security USB control Chip 12, Non Security USB control Chip 11, Code Generating Chip 13, USB Hub chip 14, and if desired additional security function chips such as a fingerprint chip.

From the foregoing, it will be appreciated that specific embodiments of the invention have been described herein for purposes of illustration, but that various modifications may be made without deviating from the spirit and scope of the disclosure. The various printed circuit board assemblies as depicted in FIGS. 1 through 9 can be combined in a multiple ways to form a variety of Multi-Layer USB Drives (MLUD). Aspects of the invention described in the context of particular embodiments may be combined or eliminated in other embodiments. Further, while advantages associated with certain embodiments of the invention have been described in the context of those embodiments, other embodiments may also exhibit such advantages, and no embodiment need necessarily exhibit such advantages to fall within the scope of the invention. Accordingly, the invention is not limited, except as by the appended claims.

The invention claimed is:

1. A multi-layer USB drive for storing data in a memory comprising:
   a. at least two printed circuit board assemblies, each one comprising:
      i. a memory for storing data; and
      ii. a control microprocessor controlling the flow of data to and from the memory;
      wherein the circuit board assemblies are operatively connected to one another in a serial manner for exchange of data between adjacent assemblies upon access by a user and wherein at least one of the control microprocessors is security enabled requiring a user defined security input for accessing the memory of the printed circuit board assembly of that security enabled control microprocessor;
   b. a USB connector for connecting to a USB slot of a device, the USB connector operatively connected to only one of the printed circuit board assemblies;
   c. a USB hub on at least one of the assemblies for expanding the USB connection of the USB connector into multiple USB connections for the circuit board assemblies and for providing connection information to the control microprocessors of the assemblies; and
   d. an opaque housing completely enclosing the circuit board assemblies preventing at least the printed circuit board assembly or assemblies other than the one connected to the USB connector from being viewed.

2. The multi-layer USB drive of claim 1 wherein successive printed circuit board assemblies require progressively greater levels of security for access to their memories moving serially from the USB connector through each of the assemblies.

3. The multi-layer USB drive of claim 1 wherein successive printed circuit board assemblies are only revealed to users serially upon user input of a predetermined action within the screen window of a computer representing the current printed circuit board assembly.

4. The multi-layer USB drive of claim 3 wherein the action is selected from the group: a mouse click on an icon; a mouse click on a picture or a predetermined part of a picture; a plurality of mouse clicks in a predetermined pattern; a screen contact on an icon; a plurality of screen contacts in a predetermined pattern, a screen contact on a picture or a predetermined part of a picture displayed on the screen.

5. The multi-layer USB drive of claim 1 wherein the housing is dimensioned to closely conform to the size of the printed circuit board assemblies contained within it.

6. The multi-layer USB drive of claim 1 wherein the number of printed circuit board assemblies is two with a first assembly attached to the USB connector configured for data flow between the control microprocessor and the first assembly and the USB connector and a second assembly configured for data flow between the control microprocessor of the second assembly to the control microprocessor of first assembly;
   wherein no security input is required to enable user access to the memory of the first assembly and a security input is required to access the memory of the second assembly.

7. The multi-layer USB drive of claim 1 wherein the number of printed circuit board assemblies is three with a first assembly attached to the USB connector configured for data flow between the control microprocessor of the first assembly and the USB connector and a second assembly configured for data flow between the control microprocessor of the second assembly and the control microprocessor of the first assembly and a third printed circuit board assembly configured for data flow between the control microprocessor of the third assembly to the control microprocessor of the second assembly;

wherein no security input is required to enable user access to the memory of the first assembly, a security input is required to access the memory of the second assembly; and a security input is required to access the memory of the second assembly.

8. The multi-layer USB drive of claim 7 wherein the security input of the third printed circuit board assembly provides a higher level of security as compared to the security input of the second printed circuit board assembly.

9. The multi-layer USB drive of claim 8 wherein the security input requirement of the second printed circuit board assembly is a user name and password and wherein the third printed circuit board assembly further comprises a code generating microprocessor and the security input requirement of the third printed circuit board assembly is user input of the code matching the code generated by the code generating microprocessor.

10. The multi-layer USB drive of claim 1 wherein the printed circuit board assemblies are oriented in co-planar alignment within the housing.

11. The multi-layer USB drive of claim 1 wherein the printed circuit board assemblies are oriented one above the other within the housing.

12. The multi-layer USB drive of claim 1 wherein the USB slot is on a computer connected to a screen and the contents of each printed circuit board assembly successfully accessed by a user are displayed together on the screen in separate windows.

13. The multi-layer USB drive of claim 1 wherein the USB slot is on a computer connected to a screen and the contents of only the first printed circuit board assembly successfully accessed by a user is displayed on the screen.

14. The multi-layer USB drive of claim 1 wherein the security input of the security enabled control microprocessors of the printed circuit board assemblies is the same for each security enabled control microprocessor.

15. The multi-layer USB drive of claim 1 wherein the security input of the security enabled control microprocessors of the printed circuit board assemblies is different for each security enabled control microprocessor.

16. The multi-layer USB drive of claim 1 wherein a printed circuit board assembly security having a security enabled control microprocessor further comprises a code generating microprocessor which generates a random code and the security input requirement of the third printed circuit board assembly is user input of the code matching the code generated by the code generating microprocessor.

17. The multi-layer USB drive of claim 16 wherein:
a. the code generating microprocessor generates a unique random code for each security enabled control microprocessor in the drive; and
b. access to the memory of the printed circuit board assemblies having a security enabled control microprocessor is through the security enabled control microprocessor.

18. The multi-layer USB drive of claim 1 wherein the USB Hub prioritizes the display of data between the printed circuit board assemblies.

* * * * *